(12) United States Patent
Rosen et al.

(10) Patent No.: US 11,445,125 B2
(45) Date of Patent: Sep. 13, 2022

(54) PARTIAL APERTURE IMAGING SYSTEM

(71) Applicant: B.G. NEGEV TECHNOLOGIES AND APPLICATIONS LTD., AT BEN-GURION UNIVERSITY, Beer-Sheva (IL)

(72) Inventors: Joseph Rosen, Omer (IL); Anand Vijayakumar, Beer-Sheva (IL); Angika Bulbul, Beer-Sheva (IL)

(73) Assignee: B.G. NEGEV TECHNOLOGIES AND APPLICATIONS LTD., AT BEN-GURION UNIVERSITY, Beer-Sheva (IL)

(*) Notice: Subject to any disclaimer, the term of this patent is extended or adjusted under 35 U.S.C. 154(b) by 316 days.

(21) Appl. No.: 16/771,425

(22) PCT Filed: Nov. 7, 2018

(86) PCT No.: PCT/IL2018/051194
§ 371 (c)(1),
(2) Date: Jun. 10, 2020

(87) PCT Pub. No.: WO2019/116364
PCT Pub. Date: Jun. 20, 2019

(65) Prior Publication Data
US 2021/0075947 A1  Mar. 11, 2021

Related U.S. Application Data

(60) Provisional application No. 62/717,840, filed on Aug. 12, 2018, provisional application No. 62/597,444, filed on Dec. 12, 2017.

(51) Int. Cl.
*H04N 5/238* (2006.01)
*G02B 26/06* (2006.01)
*G02B 27/58* (2006.01)

(52) U.S. Cl.
CPC ............ *H04N 5/238* (2013.01); *G02B 26/06* (2013.01); *G02B 27/58* (2013.01)

(58) Field of Classification Search
CPC .. H04N 5/23212; H04N 5/2351; H04N 5/238; G06T 19/006; G06T 2207/20084;
(Continued)

(56) References Cited

U.S. PATENT DOCUMENTS

| 2008/0137059 | A1  | 6/2008 | Piestun et al. |
| 2009/0027542 | A1* | 1/2009 | Yamamoto ......... H04N 5/22541 348/340 |

(Continued)

FOREIGN PATENT DOCUMENTS

AU    2011265379 A1    7/2013

OTHER PUBLICATIONS

International Search Report and Written Opinion of the International Searching Authority dated Feb. 26, 2019 in corresponding International application No. PCT/IL2018/051194; 7 pages.
(Continued)

*Primary Examiner* — Xi Wang
(74) *Attorney, Agent, or Firm* — Maier & Maier, PLLC

(57) ABSTRACT

A partial-aperture imaging system, including one or more partial-aperture units, each including) one or more partial apertures disposed over a periphery of a circular area representing a full aperture having, each partial aperture being directed towards scenery, while the total area of the partial apertures spans only a portion of the area of the full aperture; one CPM for each of the partial apertures, the CPM receiving, one at a time, from a respective partial aperture at least one point-object image and at least one complex-object image, the CPM modulating by a same random code the phases of pixels of one or more pairs of the point-object and complex-object images, to form PORIs and CORIs; an
(Continued)

imager for optically receiving the PORI—each PORI being defined as a PSF, respectively, and at least one CORI, and for storing; and a processor to form a final image.

23 Claims, 17 Drawing Sheets

(58) Field of Classification Search
CPC . G06T 2207/20081; G06T 7/50; G06T 5/003; G06T 5/30; G06N 3/084; G02B 27/58; G02B 26/06
USPC .................................. 348/349, 340; 382/151
See application file for complete search history.

(56) References Cited

U.S. PATENT DOCUMENTS

| | | | |
|---|---|---|---|
| 2011/0190616 A1* | 8/2011 | Marwala ................ | A61B 6/583 600/407 |
| 2014/0125860 A1 | 5/2014 | Tofsted et al. | |
| 2018/0241920 A1* | 8/2018 | Wippermann ....... | H04N 5/2254 |

OTHER PUBLICATIONS

Vijayakumar et al., "Coded aperture correlation holograph| a new type of incoherent digital holograms", Optical Society of America May 30, 2016, vol. 24, No. 11; 12 pages.

* cited by examiner

PARTIAL APERTURE IMAGING SYSTEM

FIELD

The field of the invention relates in general to imaging systems.

BACKGROUND

The highest resolution (namely the smallest object) that can theoretically be imaged by any imaging system is governed by the following equation:

$$\Delta_{min} = \frac{\lambda \cdot L}{D}$$

Where $\Delta_{min}$ is the minimal resolved size of the observed object, L is the distance to the object, $\lambda$ is the wavelength of the optical wave sensed by the sensor which is used by the imaging system, and D is the diameter of the aperture (for example, the diameter of a lens or a spherical mirror at the front end of the system—hereinafter, both said types of front-end elements will be referred to as "lens") which is used by the imaging system to view the scenery. As the distance to the object of interest is typically given, and cannot be changed, the only parameters that may possibly increase the highest resolution that can be achieved are: (a) the wavelength of the optical wave sensed by the sensor at the front end of the imaging system; and (b) the diameter of the system's aperture. While the operational frequency (frequency=c/$\lambda$) of the sensor depends on the wavelength (or on the spectrum) of the light which is emitted from the object and therefore can be controlled only to a limited degree, the diameter of the aperture is in fact the only major and controllable factor which can improve highest resolution of the system. However, there are many cases in which practical considerations prevent the increase of the diameter of the aperture to a desired size. For example, astronomy telescopes (for example, the Hubble) that are designed for imaging of extremely far away objects are preferably positioned outside of the atmosphere, in order to eliminate noise effects that are typical to the atmosphere. All these out-of-atmosphere telescopes are positioned on mobile platforms, therefore their aperture size cannot be increased with no limitations, for example, in view of the weight and volume that the platform can carry. For example, the aperture size of the Hubble, which is the largest space telescope which has been built so far, is 2.4 meters. Most of the above considerations with respect to the aperture size are also relevant to land telescopes, and the present invention is applicable to land telescopes as well.

Various techniques have been proposed to improve the resolution of imaging systems. For example, the Fresnel Incoherent Correlation Holography (FINCH) works on the principle of self-interference, where both interfering waves carry information of the object, but one of them is modulated by a different quadratic phase mask than the other. Under specific conditions, FINCH exhibits a super lateral resolution beyond the classical limits but with a relatively low axial resolution. Coded Aperture Correlation Holography (COACH) was developed recently based on FINCH by changing the quadratic phase modulation to a pseudo-andom phase modulation. COACH shows the same lateral and axial resolutions as of an equivalent incoherent regular imaging system with same numerical aperture. In COACH, the light diffracted by a point object is modulated by a pseudo-random Coded Phase Mask (CPM) and is interfered with the unmodulated version of the light diffracted from the same point object. The resulting impulse response hologram serves as a Point Spread Function (PSF) and is used later as the reconstructing kernel function for all the object holograms. Following the PSF generation, a complicated object is placed at the same axial location of the point object and another hologram, the object hologram, is recorded with the same CPM. The image of the object is reconstructed by a cross-correlation between the PSF and the object hologram. Therefore, for reconstruction of the object corresponding to different depths, a training phase is required in which the point object is shifted to various axial locations and a library of PSFs are created. The images of the object at different depths are reconstructed by a cross-correlation with the appropriate PSF from the library. Several useful properties of COACH, such as high axial resolution, high spectral resolution, and super-resolution capabilities have been shown recently. Another stimulating feature of COACH is the fact that 3D imaging can be achieved without two-wave interference. This version of COACH, without two-wave interference is termed Interference-less COACH (I-COACH), and is implemented by an optical configuration as simple as a regular imaging system. The intensity pattern recorded by the I-COACH system can be considered on one hand as a digital hologram generated without interference, but on the other hand, can be treated as an intensity pattern containing the 3D information of the observed scene. The interference-less property makes I-COACH ideal for numerous applications in which implementing two-wave interference is a difficult task.

While all the above synthesized-based techniques provide a resolution which to some degree is comparable to traditional techniques, they cannot circumvent the basic necessity for a large-area and relatively heavy aperture element (for example, a lens or spherical mirror) in order to obtain a high resolution.

SUMMARY

The invention relates to a partial-aperture imaging system, which comprises: (a) one or more partial-aperture units, each comprising: (a.1) one or more partial apertures that are disposed over a periphery of a circular area representing a full aperture having a diameter D, each said partial apertures being directed towards a scenery, while the total area of all said partial apertures spans only a portion of said area of the full aperture; (a.2) one coded phase mask (CPM) for each of said partial apertures, respectively, said CPM receiving one at a time, from a respective partial aperture at least one point-object image and at least one complex-object image, said CPM modulating respectively by a same random code the phases of pixels of one or more pairs of said point-object and complex-object images, thereby to form respectively point-object random images (PORIs) and complex-object random image (CORIs); (b) an imager for optically receiving said at least one PORI—each PORI being defined as a PSF, respectively, and at least one CORI, and for storing in a memory; and (c) a processor for cross-correlating those pairs of PSFs and CORIs that have been randomly modulated by a same-code CPM, thereby to form a final image.

In an embodiment of the invention, each of said PORIs is created during a training stage.

In an embodiment of the invention, each of said CORIs is created during a real-operation stage.

In an embodiment of the invention, each of said partial apertures is a lens, and wherein said lens and said CPM are contained within an integrated lens-modulator item.

In an embodiment of the invention, the system comprises a single partial aperture having a shape of a ring, said ring having a largest diameter of said D and a thickness h, wherein h≤D.

In an embodiment of the invention, the partial aperture, the CPM, the imager and the processor are contained within a same partial aperture unit.

In an embodiment of the invention, the system comprises: (a) a plurality of said partial aperture units that are equi-radially disposed and equi-angularly spaced at the periphery of said circular area representing full aperture, all said partial aperture units are activated simultaneously once during a training stage and then during a real-operation stage, to produce PORIs and CORIs, respectively, and to simultaneously and optically convey the PORIs and CORIs, whichever is the case, to a central unit; and (b) said central unit which is positioned at a remote location viewable by each of said partial-aperture units, said central unit comprising: (b.1) said imager for receiving said simultaneous PORIs and said simultaneous CORIs, respectively, as conveyed from said plurality of partial-aperture units, and for combining them to at least one combined-PORI which is defined as PSF, and to at least one combined-CORI, respectively; (b.2) said processor for cross-correlating one or more of said pairs, each comprising a PSF and a combined-CORI that have been randomly modulated by a same randomly coded CPM, thereby to form the final image.

In an embodiment of the invention, the system further comprises: (a) at each partial aperture unit: (a.2) an arrangement for performing one or more additional repetitions of PORIs and CORIs creations, each repetition results in a simultaneous optical conveyance of repeated PORIs and repeated CORIs, respectively by all aperture units, to the central unit; and (b) at the central unit: (b.1) said processor for super-positioning separately all the repeated combined-PORIs—defined as PSFs, and all the repeated combined-CORIs, to form a superposed PSF and a superposed CORI, respectively, and for cross-correlating said superposed PSF and said superposed CORI to form the final image.

In an embodiment of the invention, the system further comprises: (a) two or more revolving partial aperture units that are movable between permutations of predefined positions at the periphery of said circular area representing the full aperture, said two or more revolving partial aperture units, when positioned at respective positions relating to each specific permutation, are activated simultaneously during training and real-operation stages, respectively, to produce PORIs and CORIs, respectively, and to simultaneously and optically convey the PORIs and CORIs, whichever is the case, to a central unit; and (b) said central unit which is positioned at a remote location viewable by each of said partial-aperture units, said central unit comprising: (b.1) said central unit imager for simultaneously receiving at each permutation a plurality of PORIs and a plurality of CORIs, respectively, from said partial-aperture units, and for combining them to combined-PORIs—defined as PSF, and combined-CORIs, respectively; (b.2) said processor for first cross-correlating separately each of the pairs, each pair comprising a PSF and a combined-CORI, respectively, that have been randomly modulated by the same CPM, thereby to form by each repetition a temporary image, and then to sum all the separate temporary images to form the final image.

In an embodiment of the invention, said two or more revolving partial aperture units, are a pair of revolving partial aperture units.

In an embodiment of the invention, said predefined positions at the periphery of said circular area representing the full aperture are equi-radially disposed and equi-angularly spaced.

In an embodiment of the invention, the system performs several repetitions in each of said permutational positions and wherein said processor at the central unit performs a super-position of all the PSFs that are included in a same permutation and a super-position of all the PORIs that are included in a same permutation, prior to performing said cross correlation.

The invention also relates to a method for performing partial-aperture imaging which comprises: (a) predefining a circular area representing a full aperture having a diameter D; (b) providing one or more partial aperture units that are disposed at the periphery of said full aperture area, each partial unit comprises: (b.1) a partial aperture for acquiring images from a scenery; and (b.2) one coded phase mask (CPM) for randomly modulating phases of pixels of the images received from said partial aperture; (c) providing an imager for receiving one or more simultaneous images from said CPM; (d) during a training stage: (d.1) acquiring a point image from the scenery; (d.2) subjecting the point image to said CPM thereby to form a point-object random image (PORI), and conveying optically to said imager; and (d.3) defining the PORI, as viewed by the imager, as a PSF and storing in a memory; (e) during a real-operation stage: (e.1) acquiring a complex-object image from the scenery; (e.2) subjecting the complex-object image to said CPM thereby to form a complex-object random image (CORI), and conveying to said imager; and (e.3) storing the CORI as viewed by the imager in the memory; and (f) cross correlating between said stored PSF and said stored CORI, thereby to form a final image.

In an embodiment of the invention, each of said partial apertures is a lens, and wherein said lens and said CPM are contained within an integrated lens-modulator item.

In an embodiment of the invention, said at least one partial aperture is a ring having a largest diameter of said D and a thickness h, wherein h≤D.

In an embodiment of the invention, said partial aperture, said CPM, said imager and said processor are contained within a same partial aperture unit.

In an embodiment of the invention, the method is repeated several times, and wherein: (a) the several created and stored PSFs are superposed to create a single PSF; (b) the several created and stored CORIs are superposed to create a single CORI; and (c) the cross-correlation is performed between said stored single PSF and said stored single CORI.

In an embodiment of the invention: (a) said at least one partial aperture units are plurality of partial aperture units that are equi-radially disposed and equi-angularly spaced at the periphery of said circular area representing full aperture, each of said partial aperture units comprising said partial aperture having a diameter d where d<D, and said CPM; and (b) said imager, said processor, and said memory are contained within a central unit which is viewable by each of said partial aperture units.

In an embodiment of the invention, the method further comprises: (a) performing each of said training stage and real-operation stage simultaneously by all the partial aperture units, thereby to convey a plurality of simultaneous PORIs and a plurality of simultaneous CORIs, respectively, to the central unit; (b) receiving by the imager of the central unit said simultaneous PORIs during the training stage, combining them to a PSF, and storing in the memory; and (c) receiving by the imager of the central unit said simultaneous CORIs during the real-operation stage, combining them to a combined-CORI, and storing in the memory; and, (d) cross-correlating between said PSF and said combined CORI to form the final image.

In an embodiment of the invention, the method is repeated several times, and further comprises: (a) superposing all the plurality of the PSFs as created at the central unit during a plurality of the training stages thereby to form a superposed PSF, and storing in the memory; (b) superposing all the plurality of the combined-CORIs as created at the central unit during a plurality of the real-operation stages, thereby to form a superposed-CORI, and storing in the memory; and (c) cross-correlating between the superposed PSF and the superposed-CORI, thereby to form the final image.

In an embodiment of the invention, (a) said at least one partial aperture units are pair of partial aperture units that are revolving between a plurality of permutational positions, said positions are equi-radially disposed and equi-angularly spaced at the periphery of said circular area representing full aperture, each of said partial aperture units comprising said partial aperture-having a diameter d where d<D, and said CPM; (b) said imager, said processor, and said memory are contained within a central unit which is viewable by each of said partial aperture units.

In an embodiment of the invention, the method comprises: (a) positioning said pair of partial aperture units at first permutational position, performing each of said training stage and real-operation stage simultaneously by the pair of partial aperture units, thereby to convey a pair of simultaneous PORIs and a pair of simultaneous CORIs, respectively, to the central unit; (b) receiving by the imager of the central unit said pair of simultaneous PORIs during the training stage, combining them to a PSF, and storing in the memory; (c) receiving by the imager of the central unit said pair of simultaneous CORIs during the real-operation stage, combining them to a combined-CORI, and storing in the memory; (d) repeating all the above stages for all the rest of the permutational positions; (e) for each permutation, cross-correlating between the respective PSF and the respective combined-CORI, thereby to obtain a plurality of temporary images, one temporary image for each permutation; and (f) summing-up all said temporary images, thereby to form the final image.

In an embodiment of the invention, the method further comprises: (a) repeating m times each of said training stage and said real-operation stage for each of the n permutational positions; (b) for each of m repetitions of n permutations training stage, storing the PSF in the memory; (c) for each permutation, superposing the m PSFs and storing a resulting single superposed-PSF in memory; (d) for each m Repetitions of n permutations real operation stage, storing the combined-CORI in the memory; (e) for each permutation, superposing the m combined-CORIs and storing a resulting single superposed-CORI in the memory; (f) for each permutation, respectively, cross-correlating between the respective superposed-CORI and the superposed-PSF to obtain a temporary image; and (g) summing all the temporary images to obtain the final image.

DETAILED DESCRIPTION OF PREFERRED EMBODIMENTS

As discussed above, the most significant factor which is practically available to influence the resolution of a long-distance imaging system is the size of the aperture. As a result of this fact, high-resolution telescopes, particularly those used for astronomy purposes, must apply apertures of large-area and heavy weight. The present invention provides a system which utilizes only a small fracture of the aperture size compared to a full-size aperture, and by utilizing this small fracture of aperture, the system still achieves an image having a resolution which is substantially the same as the resolution achievable by a full-size aperture.

Figure 1:
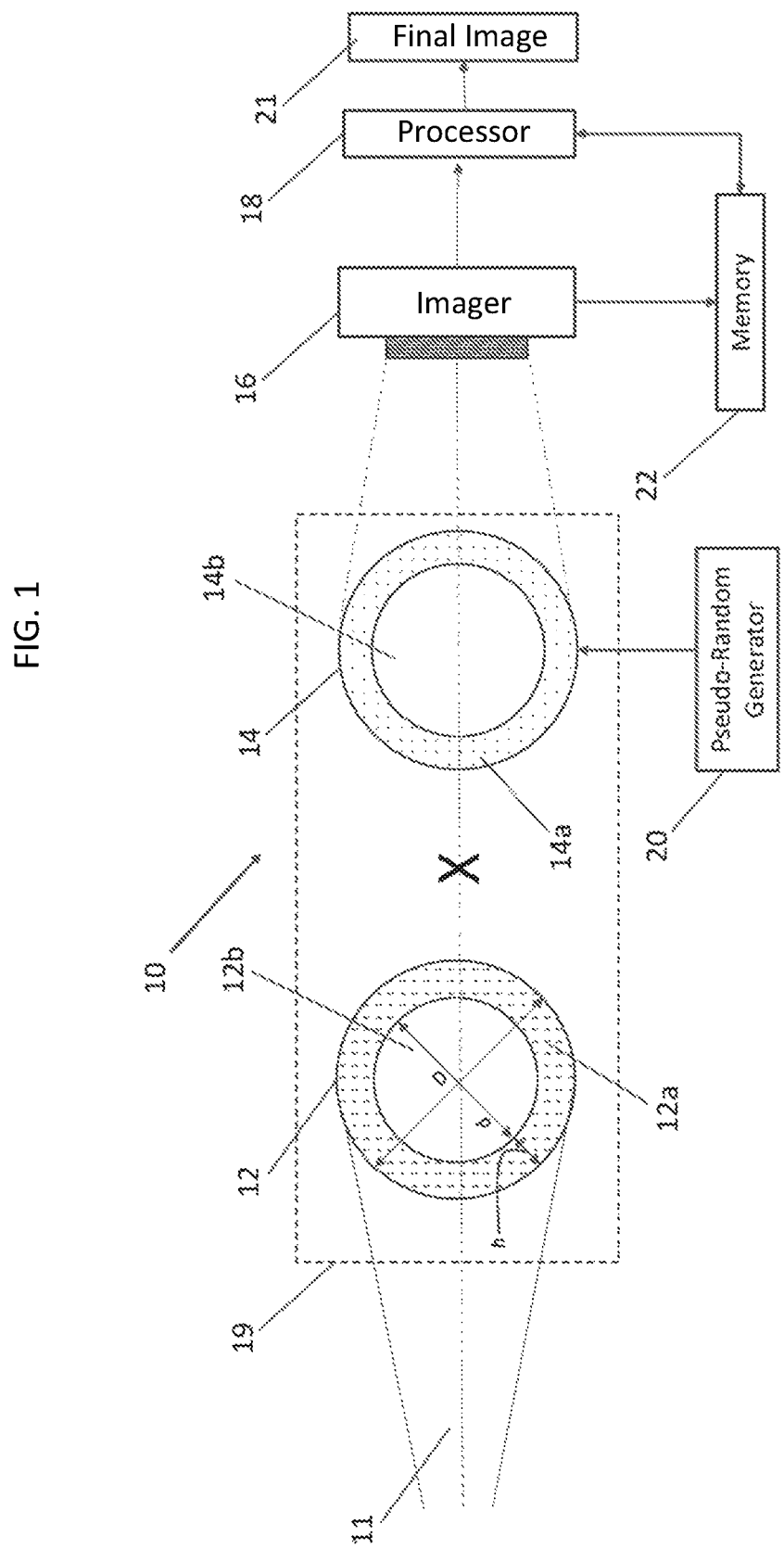
FIG. 1 illustrates in a general schematic block diagram form an exemplary structure of the PAIS I embodiment.

FIG. 1 illustrates in a general schematic block diagram form an exemplary structure of a Partial-Aperture Imaging System (PAIS) 10 according to a first embodiment (hereinafter, PAIS I) of the invention. The system includes a partial-aperture lens 12 having a ring shape. The ring is defined as the area between an outer circle having a diameter D and an inner circle having a diameter d, where the difference $h=D-d$ defines the thickness of the partial aperture, ring-shaped lens. The active area 12a of the ring-shaped lens 12 is significantly smaller compared to the full area of the outer circle having diameter D. Therefore, the ring-shaped lens 12 in fact forms a partial aperture relative to a theoretical full-circular lens having diameter D. The active area 12a of the lens views the scenery 11, while the inactive area 12b has no function, and in fact may be nulled. Throughout this description, and for better clarity, the lens 12, the CPM 14, as well as other elements are shown rotated by 90° relative to their actual orientation with respect to the scenery. The image which is seen by the active area 12a of the ring-shaped lens 12 is conveyed to a ring-shaped pseudo-random Coded Phase Mask (CPM) 14 having an active area 14a which is typically the same or smaller than the active area 12a of the lens 12. The central area 14b which is surrounded by the ring-shaped CPM 14a is null. The lens 12, as well as the CPM 14 may in some cases be combined to a single integral lens-modulator unit 19 which combines both the partial-aperture lens 12 and the CPM 14. In case that lens 12 and CPM 14 are not combined, the gap between them is negligibly small. Additionally, the order of their appearance is not important, i.e. if CPM 14 is closer to the light source than lens 12, the system operates identically to the case when lens 12 is closer to the light source. The CPM is in fact a modulator which randomly modulates the phases of each of the pixels of the image which is acquired by the active area 12a of lens 12. The CPM 14 may include, for example, an array of liquid-crystal pixels within area 14a. A pseudo-random generator 20 provides a code to the CPM which randomly modulates the pixels of the array such that the resulting output phases of the individual pixels of the CPM 14 are randomly varied. Therefore, imager 16 (this imager is in fact an image sensor, such as a digital camera) views a randomly-converted image of the scenery, as seen by the ring-shaped lens 12 and randomly converted by the CPM 14. The system 10 also includes a memory 22 for storing images and/or image-functions (hereinafter referred to as PSFs), and a processor 18 which processes the stored images (in a manner which will be elaborated hereinafter) to create a final image 21.

Figure 2A:
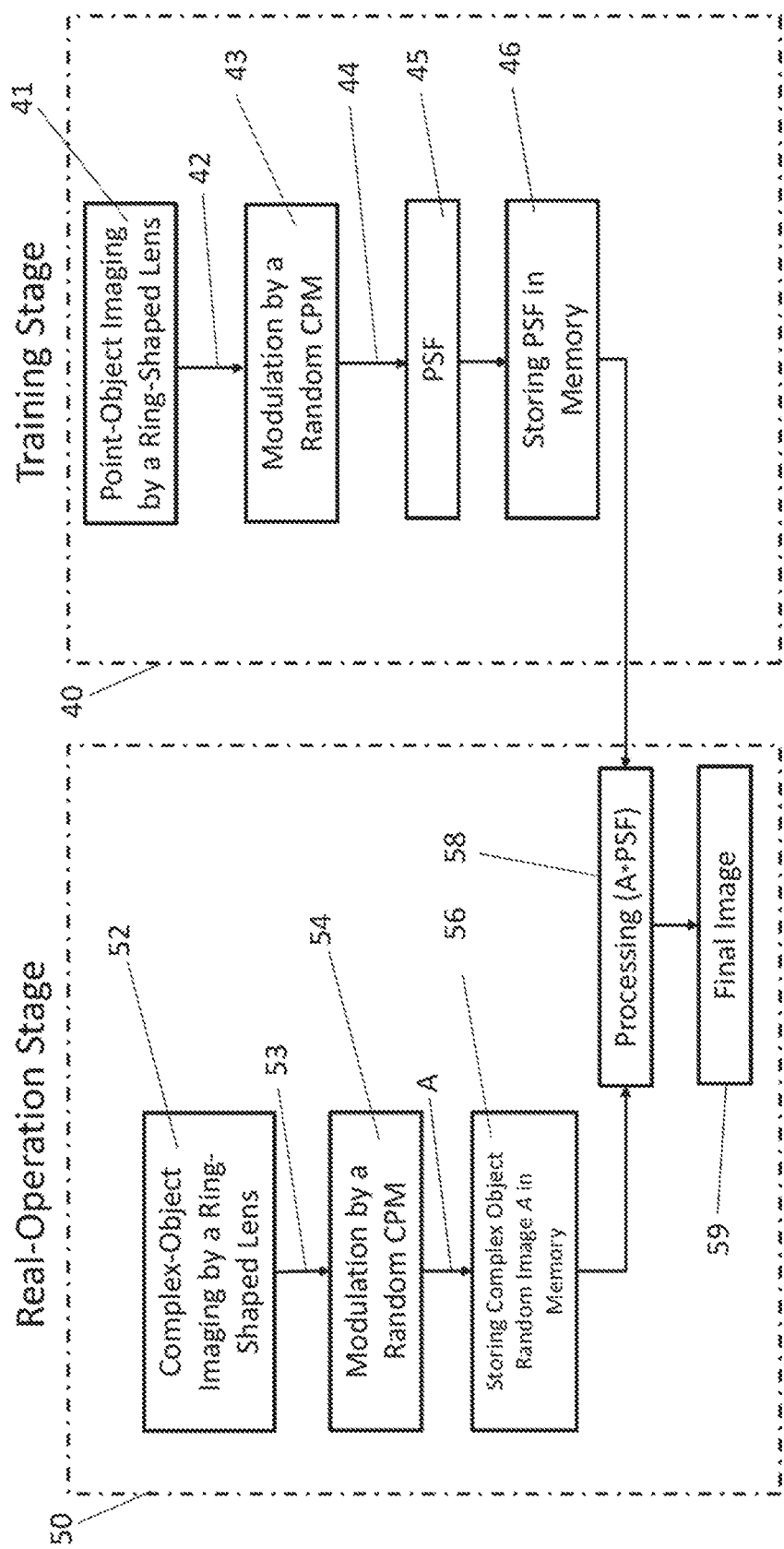
FIG. 2a illustrates in a general flow diagram form the process which is performed by the PAIS I embodiment of FIG. 1.

FIG. 2a illustrates in a general flow diagram form the process which is performed by the partial-aperture imaging system 10 of FIG. 1. Initially, the system goes through a training stage 40. In step 41, a point-object at a selected axis, typically the central axis of the system, is imaged by the ring-shaped lens 12 of FIG. 1 to form a point-ring-image 42. The point-ring-image 42 is conveyed to the randomly-modulated coded phased mask (CPM) 14 (FIG. 1), which in turn randomly modulates 43 the phases of various pixels of the point-ring-image 42 to form a point-object random image (PORI) 44. PORI 44 is defined as a Point-Spread-Function (PSF) 45. The PSF 45 is then stored 46 in the memory 22 of the system of FIG. 1.

In a real operation stage 50, a complex object is imaged 52 via the same ring-shaped lens 12 of FIG. 1 to form an object-ring-image 53, which is conveyed to the coded phased mask (CPM) 14. CPM 14, which is the same mask that was used during the training stage, randomly modulates 54 the phases of the pixels of the object-ring-image 53 to form a Complex Object Random Image (CORI) A. For the random modulation, the CPM 14 uses a same random code that was provided by the pseudo-random generator 20 and used by the CPM 14 during the training stage 40. The CORI A is conveyed to memory 22, and stored 56. The final image is produced in step 58 by a cross-correlation between the PSF (which was previously stored in step 46 of the training stage) and the CORI A (which was stored in step 56 of the real-operation stage 50. As will be discussed in more details hereinafter, the resolution of the final image 59, as achievable by the process of FIG. 2a using a ring-shaped partial-aperture, is substantially the same as is achievable by a direct imaging procedure using a full circular aperture of diameter D. This fact is surprising, as the area of the partial-aperture which is used in the process of FIG. 2a is substantially smaller (typically less than 10%) compared to the area of the full-circular aperture of diameter D used by the direct imaging.

Figure 2B:
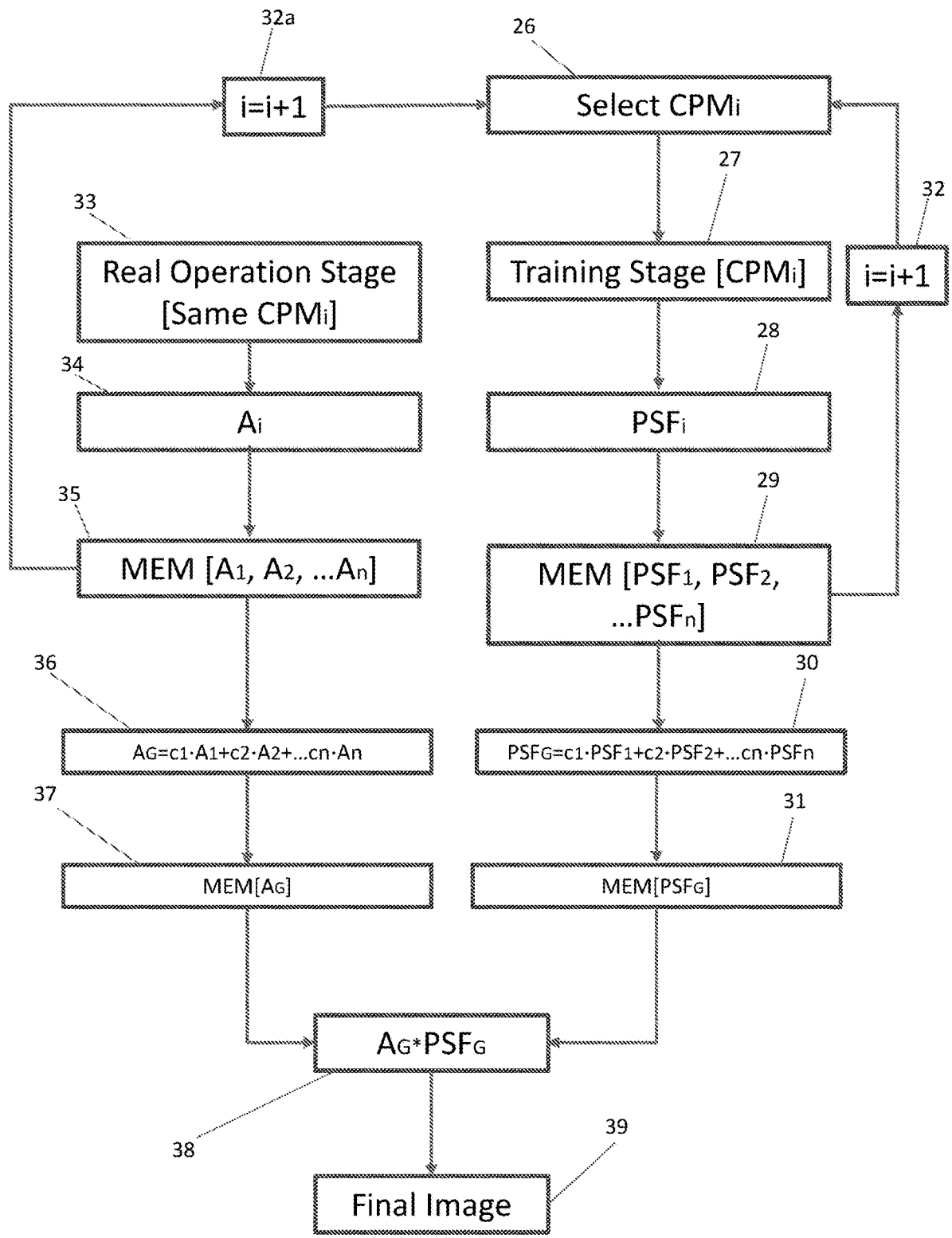
FIG. 2b illustrates in a general flow diagram form a repetition process for the PAIS I embodiment.

The process of FIG. 2a can be further improved to provide even a higher resolution, if repeated several times (for example, 3 times), each time with a differently coded CPM (however, in each said repetitions a same CPM which was used during the training stage is also the one used during the real-operation stage). FIG. 2b describes such an improved process. In step 26, a first CPM ($CPM_1$) is selected. In step 27, a training stage, similar to the training stage of FIG. 2a is performed while the CPM 14 uses a first randomly generated code, resulting (step 28), in a first PSF ($PSF_1$). In step 29, the PSF1 is stored in the memory. Next, the CPM 14 is replaced (steps 32 and 26) to $CPM_2$ (which uses a different random code than used by $CPM_1$), and the training stage 27 is repeated to produce (step 28) a next Point Spread Function PSF2, which is again stored 28 in the memory. The above procedure may be repeated one or more additional times, each time with a differently coded CPM. At the end of the repetitions, the memory of stage 29 contains several PSFs ($PSF_1 \ldots PSF_n$). Next, in step 29 a global $PSF_G$ is calculated by the following super position:

$$PSF_G = c_1 \cdot PSF_1 + c_2 \cdot PSF_2 + \ldots c_n \cdot PSF_n$$

Where $C_1 \ldots C_n$ are complex constants selected to produce a $PSF_G$ which is unbiased (namely without a DC component). The global $PSF_G$ is then stored 31 in the memory for a later use during the real operation stage.

Next, in step 33 a real operation stage is performed, first with the same coded $CPM_1$ (of the training stage) in a similar manner as in the process of FIG. 2a, resulting (step 34) in a first complex-object random image (CORI) $A_1$. In step 35, the CORI $A_1$ is stored the memory. Next, $CPM_1$ is replaced by $CPM_2$ (namely, the same coded $CPM_2$ that was used during the training stage) and the real operation stage 33 is repeated to produce 34 a second CORI $A_2$, which is then added 35 to the memory. Steps 33, 34, and 35 may be repeated 32a one or more additional times, resulting in the memory storing in stage 35 a plurality of CORIs $A_i \ldots A_n$. Next, in step 36 a global CORI $A_G$ is calculated based on a super position operation as follows:

$$A_G = c_1 \cdot A_1 + c_2 \cdot A_2 + \ldots C_n \cdot A_n$$

Where $c_1, \ldots c_n$ are the same constants that were previously used to calculate the global $PSF_G$ during the training stage. The calculated $A_G$ is then stored 37 in the memory.

Finally, in step 38 a cross-correlation $A_G * PSF_G$ is performed between the global CORI $A_G$ and the global $PSF_G$, resulting in the final image 39. As will be demonstrated hereinafter in specific examples, a final image $A_G$ that can be obtained in the process of FIG. 2b, for example by using 3 image-acquiring repetitions, is improved in terms of its resolution compared to the image that can be obtained in the process of FIG. 2a with one repetition only, and the resolution of $A_G$ is also substantially the same compared to the image resolution which is achievable by a direct imaging utilizing the full circular aperture having a diameter D.

It should be noted that the training stage is done only once per setup. Once the training of a given PAIS or SMART (an embodiment of the invention that will be described hereinafter) systems is completed, the stored PSFs are used to reconstruct the entire images acquired in the real-operation stages. In other words, there is no need to repeat the training stage when a new object is imaged by the system. In fact, the training stage can be done once by the manufacturer and the customer may work with the system only in the real-operation mode without the need to perform training stages at all. As noted, this comment is true with respect to all the embodiments ("PAIS" and "SMART") included in this application.

Figure 3:
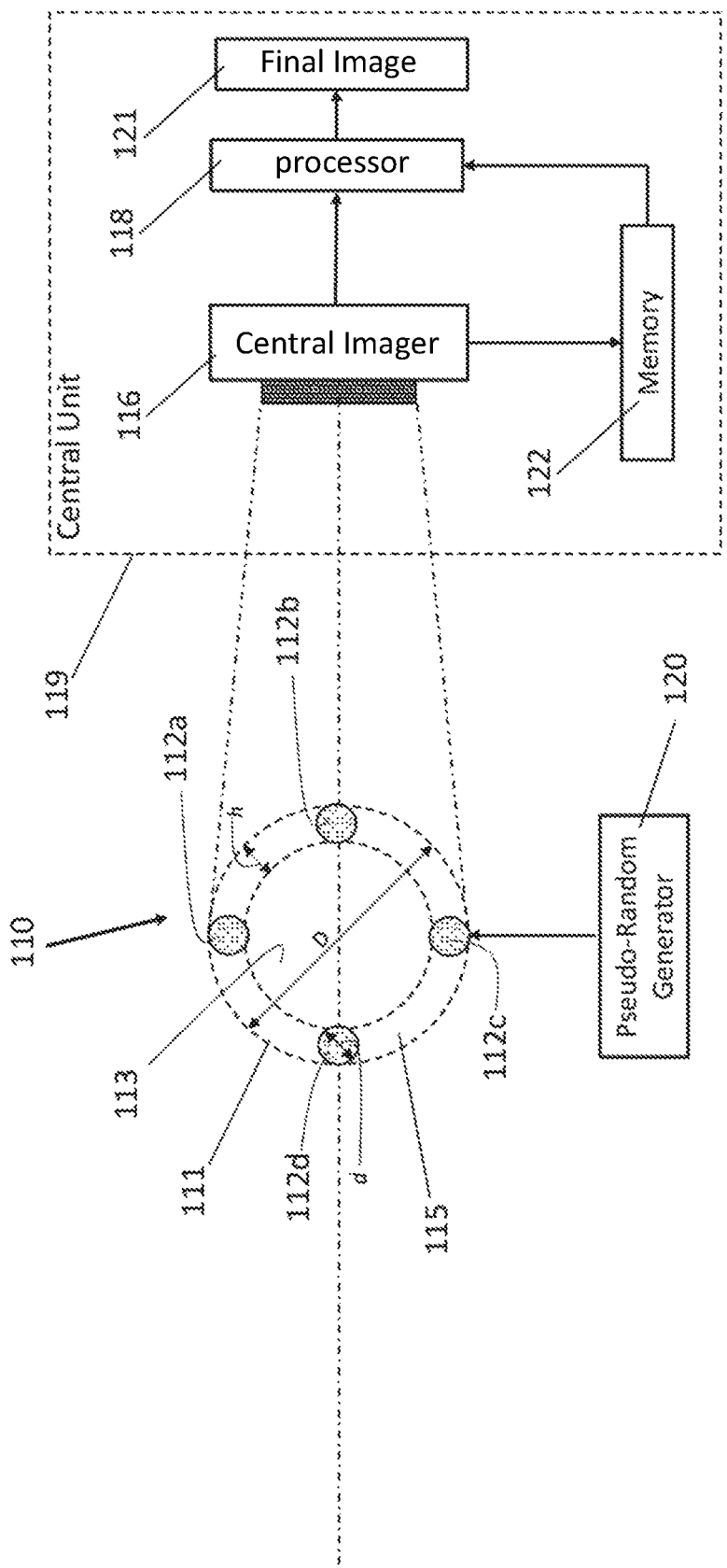
FIG. 3 illustrates in a general schematic block diagram form an exemplary structure of the PAIS II embodiment.

FIG. 3 generally illustrates in a schematic block diagram form an exemplary structure of a partial-aperture imaging system (PAIS) 110 according to a second embodiment (hereinafter, PAIS II) of the invention. The system includes a plurality of partial-aperture units 112a, 112b, ... 112n (only four are shown), where n≥2 that are equi-radially and equi-angularly disposed over the periphery of a full-circular aperture 111 having a diameter D. Each partial-aperture unit 112 has a substantially circular aperture having a diameter d, which is substantially smaller than the diameter D of the full aperture 111 (for example, d≤0.2D). The exemplary embodiment of FIG. 3 shows 4 of such partial-aperture units 112a, 112b, 112c, and 112d. The combined total area of the circular apertures of all the partial-aperture units 112 is therefore significantly smaller compared to the area of the peripheral ring 115 (having thickness h=d), and very significantly smaller compared to the area of a full-size aperture 111 having a diameter D. All the partial aperture units 112a, 112b, 112c, 112d (that are shown rotated by 90° relative to their actual orientation with respect to the scenery 111) are activated simultaneously to acquire their respective images (either during a training stage or during a real-operation stage) from the scenery 111. In similarity to the PAIS I embodiment of FIG. 1, in the PAIS II embodiment of FIG. 3 each partial aperture 112 comprises a pair of a lens-CPM, either in a single integral unit or as two distinct units with substantially zero gap between them. Each CPM within each partial aperture unit 112 is randomly modulated by a pseudo-random generator 120 (for the sake of brevity, only one of the four separate pseudo-random generators is shown in FIG. 3). In similarity to the system of FIG. 1, the system has a training stage. In the training stage, a PSF is created at the central unit based on a plurality of distinct point-object random images that are acquired and produced respectively by each partial aperture unit 112, and conveyed optically to the central unit 119, in which the entire contributions from all units 112 are simultaneously combined and recorded by the central imager 116. It should be noted that in a typical imager operation the output of the imager is in fact $I=|A|^2$ where I is the intensity of the signal and A is the electromagnetic field of the light wave at the input. The "combining" operation by the imager, as used herein, for example of N optical signals A1, A2 ... AN: is $I=|A_1+A_2+\ldots+A_N|^2$. This "imager combination" term is also referred to in the art as "interference". The PSF is then stored in memory 122. The system also has a real-operation stage. During the real-operation stage, a plurality of complex-object random images (CORIs) are acquired and produced simultaneously, each by a single partial aperture unit 112, respectively, and are conveyed simultaneously to the central imager 116 within the central unit 119. Central imager 116, receives the plurality of CORIs simultaneously, and combines them to a single combined-CORI. Finally, processor 118 cross-correlates between the combined CORI and the stored PSF to produce a final image 121. It should be noted that a same CPM, respectively, is used in the partial aperture units 112 both during the training stage and during the real-operation stage.

Figure 4:
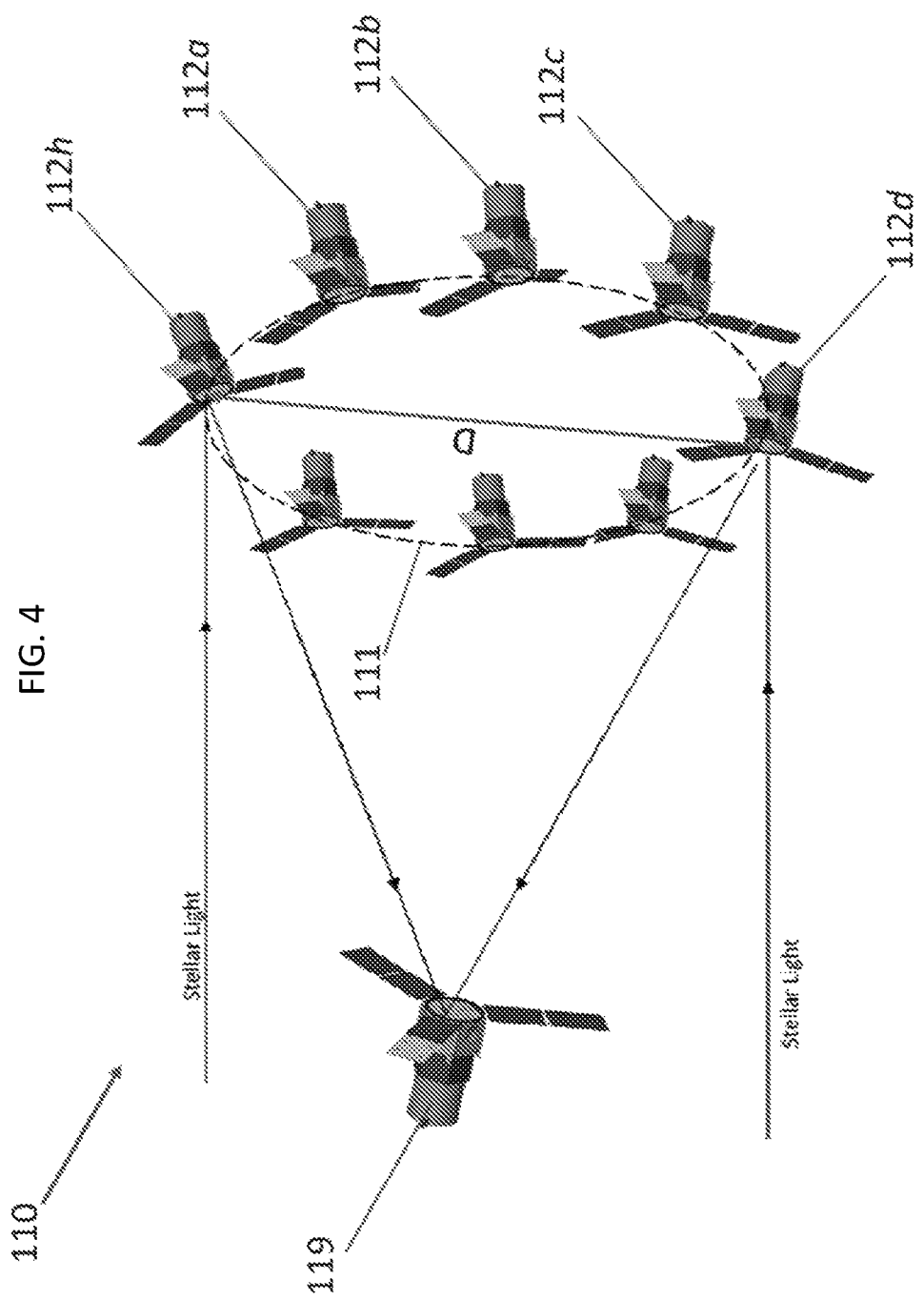
FIG. 4 schematically illustrates an exemplary space telescope which is formed based on the PAIS II system of FIG. 3.

FIG. 4 schematically illustrates an exemplary space telescope which is formed based on the PAIS II system of FIG. 3. The space telescope 110a includes eight partial-aperture satellite imagers 112a-112h, each having a circular aperture of diameter d (not shown), and a central-satellite unit 119. The eight partial aperture satellites 112a-112h, are disposed along a periphery of a virtual circuit 111 having a diameter D. All the nine satellites, namely, the eight partial aperture satellites 112a-112h, as well as the central satellite unit 119 are always kept in a constant relative position and orientation one with respect to all others in space. All the partial aperture satellites 112 simultaneously acquire their point images (during the one or more training stages), produce respective PORIs using a CPM, respectively, in each partial aperture satellite, and convey them optically to the central satellite unit 119. Similarly, all the partial aperture satellites 112 simultaneously acquire complex-object images (during the one or more real-time stages), produce respective CORIs using same CPMs respectively as was used during the training stage, and convey them optically to the central satellite unit 119. The central satellite unit 119 reconstructs the final image from all the PORIs and CORIs images that it receives from the 8 partial aperture satellites 112. As will be shown, the resolution of the final image, as reconstructed by the PAIS II system of FIG. 4, is substantially the same as the resolution that can be achieved by a single telescope having an aperture D and operating in direct imaging fashion. Moreover, if the training and real-operation stages are repeated several times, the resulting final image is further improved.

Figure 5A:
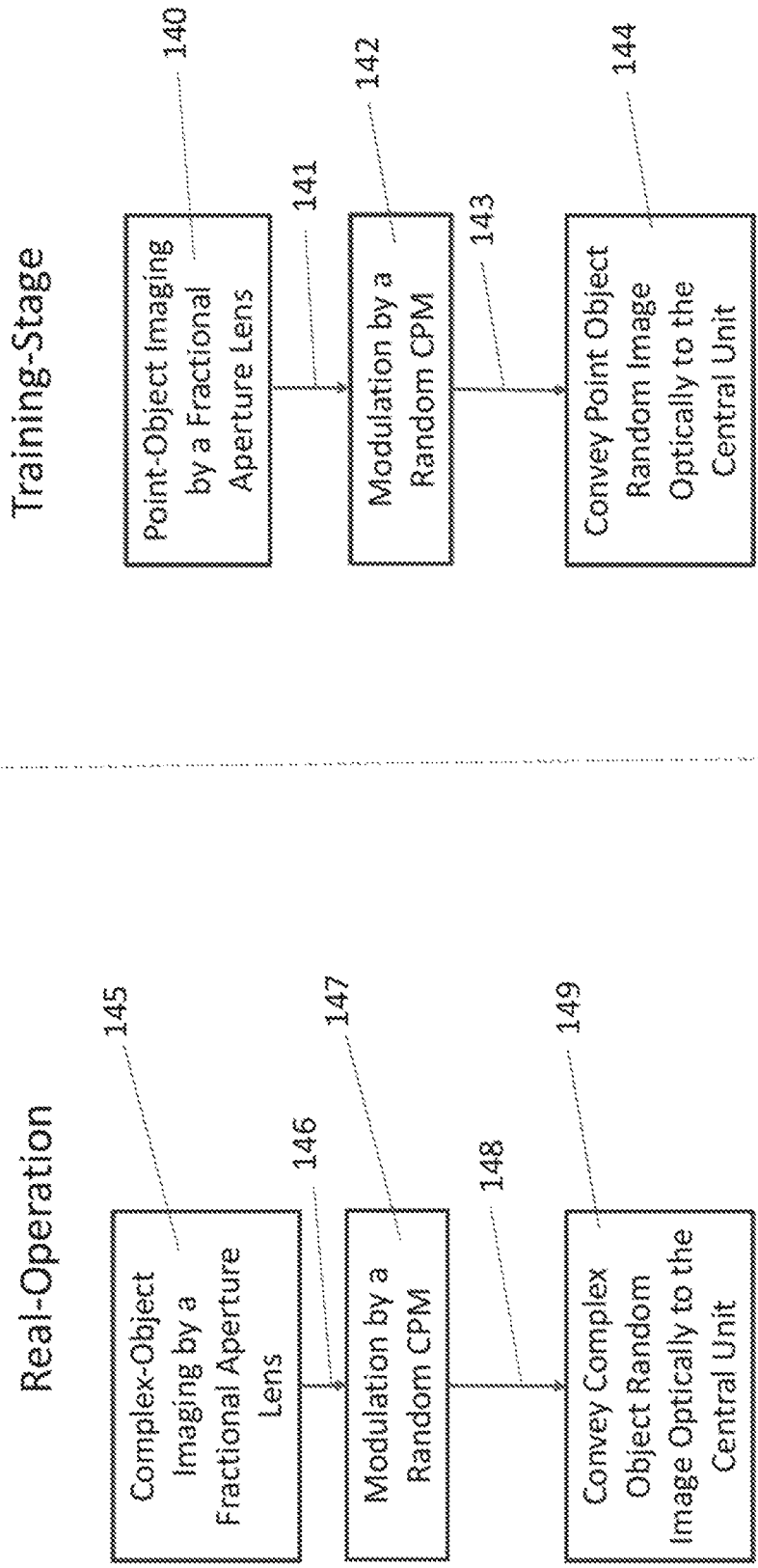
FIG. 5a illustrates in a general flow diagram form an exemplary process which is performed by each of the partial-aperture units of the PAIS II embodiment of FIG. 3.

FIG. 5a illustrates in a general flow diagram form the process which is performed by each of the partial-aperture units 112a ... 112n of FIG. 3. Initially, the partial aperture unit performs a training stage (steps 140-144) simultaneously with the other partial-aperture units. In step 140, a point-object at a selected axis, typically the central axis of the system, is imaged within the partial aperture unit 112 to form a point-object image 141. The point-object image 141 is conveyed to a CPM within the unit 112, which in turn randomly modulates 142 the phases of the pixels of the point image 141 to form a point-object random image (PORI) 143. In step 144 the PORI is conveyed optically to the central unit. As a similar process is performed simultaneously by all the partial aperture units 112 (each unit 112 using its own CPM), all the fractural aperture units in fact convey their respective PORIs simultaneously during the training stage to the central unit 119.

In real operation, a complex object is imaged 145 via a lens within the partial imaging unit 112 to form a complex-object image 146 which is conveyed to the same CPM which was used within the unit during the training stage. The CPM randomly modulates 147 the phases of the pixels of the complex object image 146 to form a complex object random image (CORI) 148. The CORI is then conveyed in step 149 optically to the central unit. As the real-operation stage of FIG. 5a is performed simultaneously by all the partial aperture imaging units 112a-112n, a plurality of CORIs are in fact conveyed optically in the real operation stage to the central unit 119.

Figure 5B:
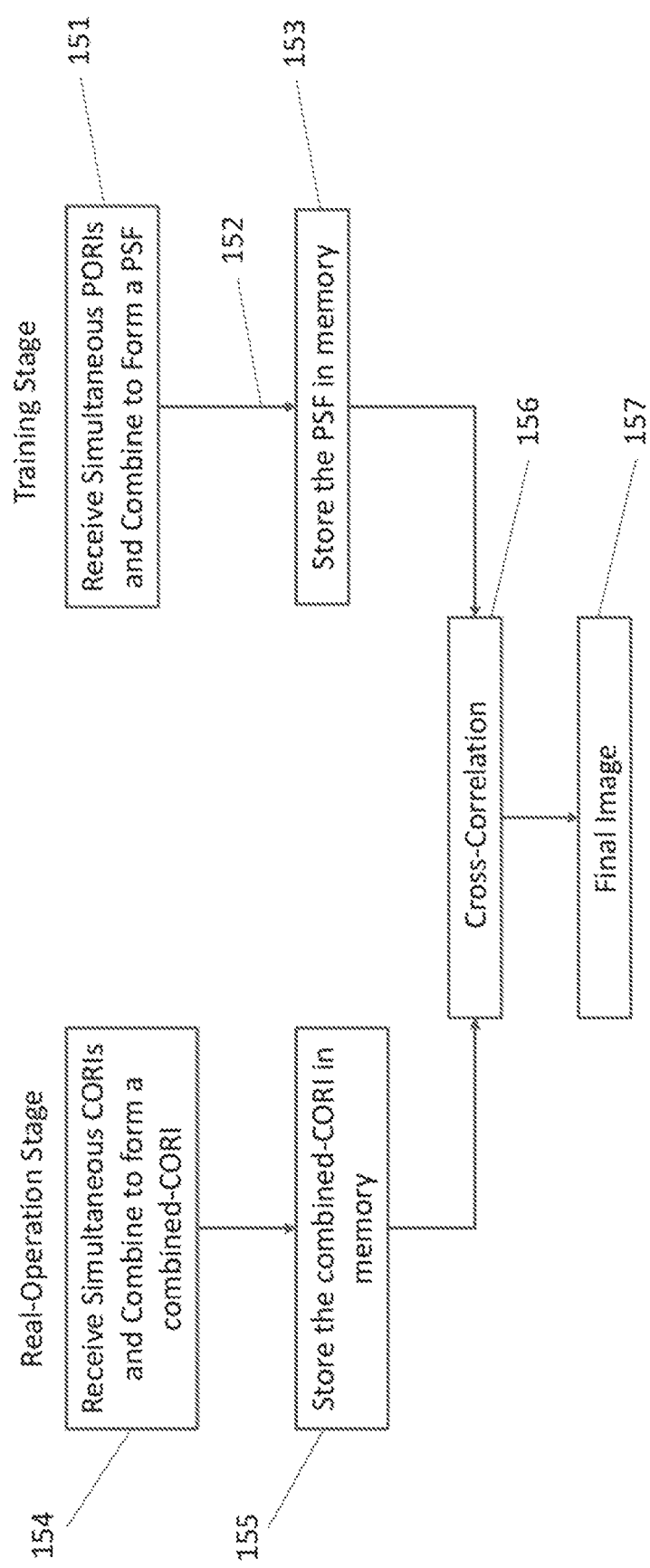
FIG. 5b illustrates in a flow diagram form how a final image is reconstructed at the central unit of the PAIS II embodiment of FIG. 3.

FIG. 5b illustrates in a flow diagram form how the final image is reconstructed at the central unit 119. During the training stage, a plurality of point-object random images (PORIs) are received optically and simultaneously 151 at the imager of the central unit 119. The imager in fact combines all the PORIs to a combined-PORI (namely, it performs $|PORI_1+PORI_2+\ldots+PORI_n|^2$), which is defined as a PSF and stored 143 within memory 122. During the real-operation stage, a plurality of complex-object random images (CORIs) are received optically and simultaneously 154 at the imager of the central unit 119. The imager of the central unit combines all the received CORIs to form a combined-CORI, which is stored 155 within the memory 122. In step 156, the PSF (that was previously stored in step 153) is cross-correlated 156 with the combined-CORI (that was stored in step 155) to form the final image 157. The resolution of the final image that is achievable by the process of FIGS. 5a-5b (using a plurality, for example, 4 or 8 partial aperture units, each having a diameter d, where for example d≤0.2 D, is substantially the same as the resolution that can be achieved by a single full-aperture imager having a diameter D operating in direct imaging.

Figure 5C:
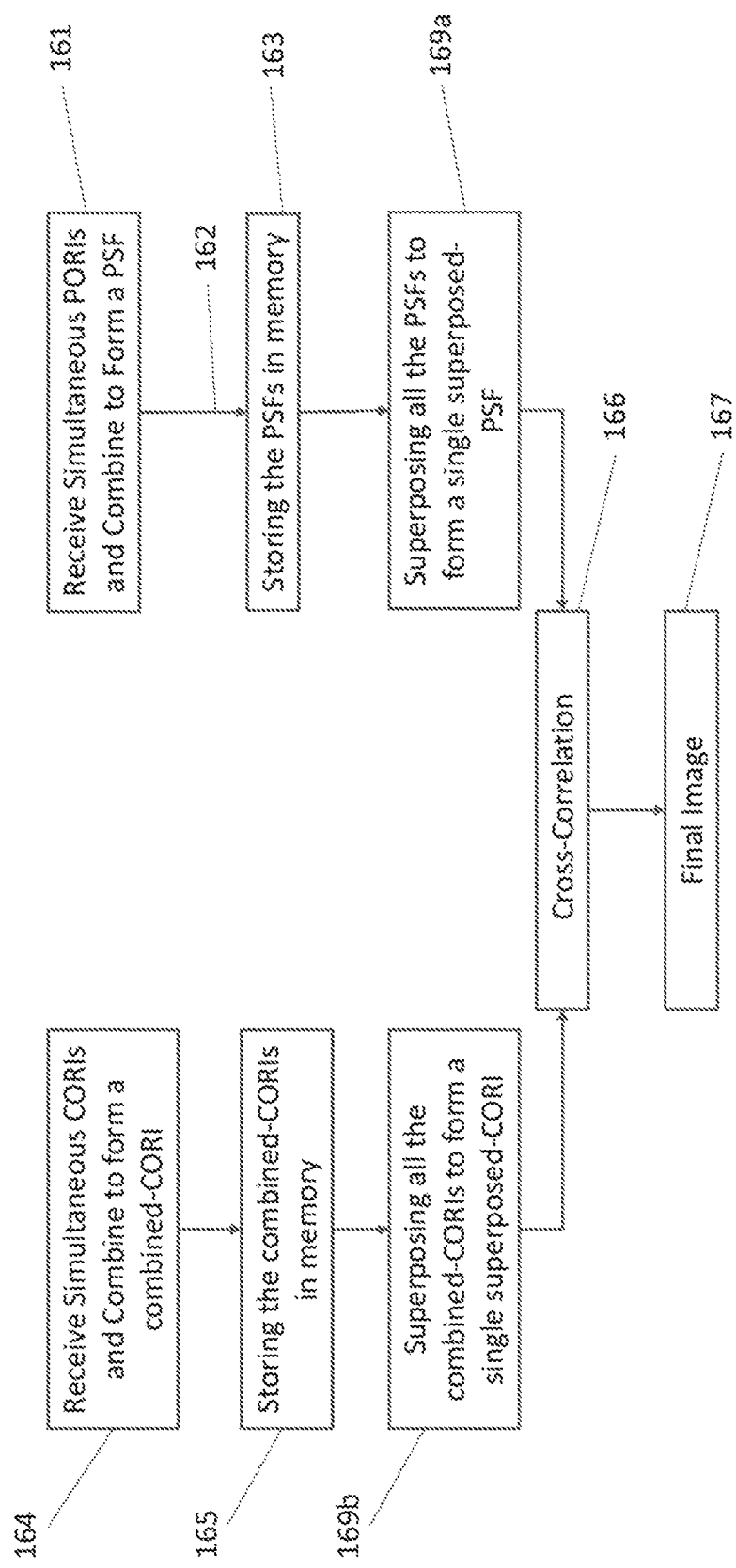
FIG. 5c illustrates in a general flow diagram form a repetition process for the PAIS II embodiment of FIG. 3.

The resolution which is achievable by the process of FIGS. 5a and 5b can be further improved by repetition. According to this procedure, the entire (training and real-operation) process of FIG. 5a is repeated several times (for example, 3 times), each time with a different CPM, while during each repetition keeping a same CPM in both the training stage and the real-operation stage. FIG. 5c illustrates the process which is performed at the central unit 119 following said repetitions. Steps 161-165 are similar to steps 151-155, respectively, of FIG. 5b, besides the fact that they are repeated herein several times. Therefore, in steps 163 and 165, the memory in fact stores a plurality of PSFs and a plurality of combined-CORIs respectively. In step 169a all the plurality of PSFs are superposed to form a single superposed-PSF, and in step 169b all the combined CORIs are superposed to form a single superposed-CORI. In step 166 a cross-correlation is performed between the single Superposed-PSF and between the single Superposed-CORI to form the final image 167. As mentioned before, the achievable resolution of the final image 167 in the repeated PAIS II process of FIG. 5c is higher compared to the final image 157 which is achievable by the process of FIGS. 5a and 5b (operating with a plurality of partial aperture units 112, each having an aperture of diameter d where for example d≤0.2 D), and is also substantially the same as the resolution which is achievable by a full-aperture system having an aperture of diameter D and operating in direct imaging.

Figure 6:
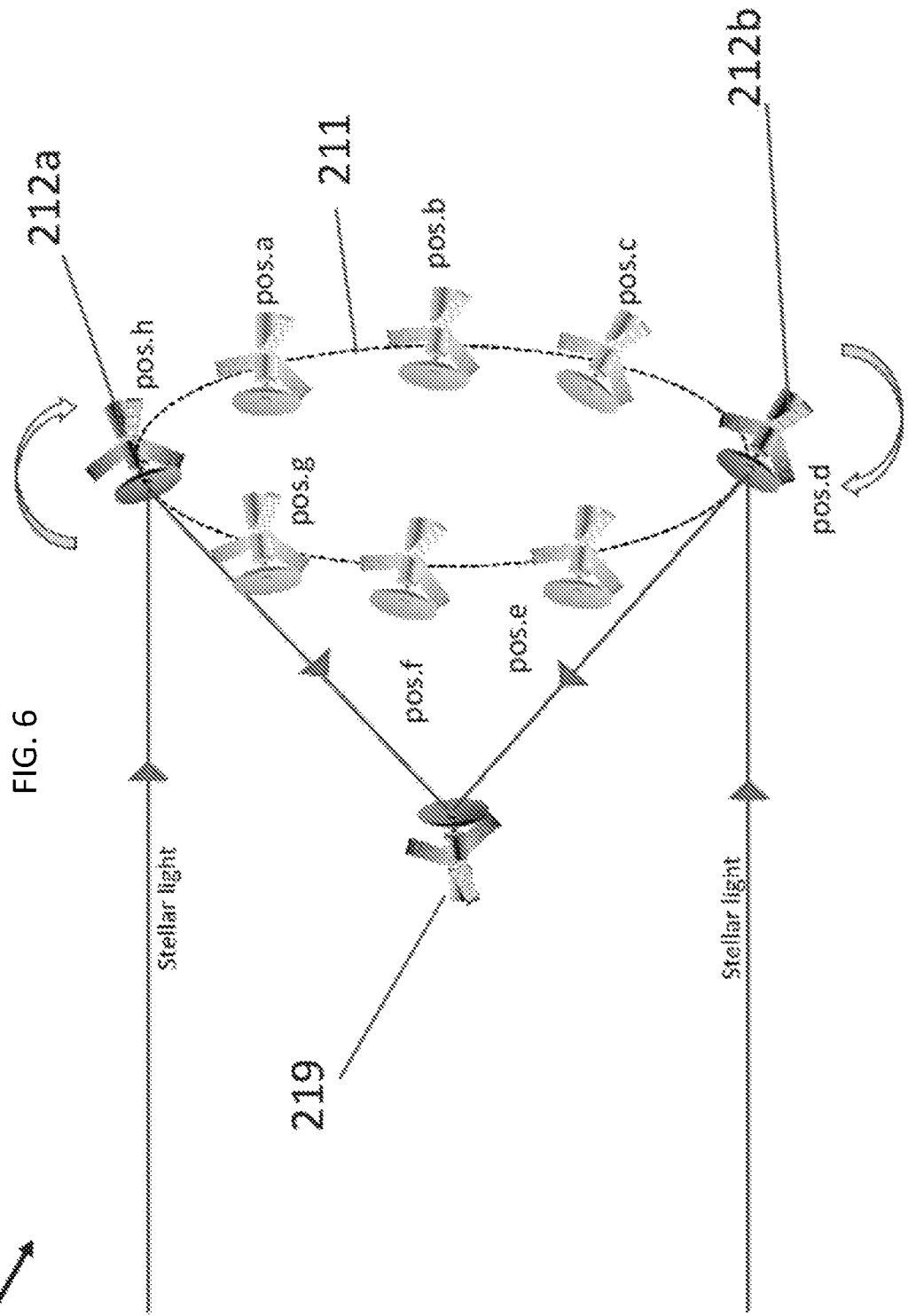
FIG. 6 illustrates in a general schematic block diagram form an exemplary structure of the SMART embodiment.

FIG. 6 schematically illustrates a third embodiment of the invention, hereinafter referred to as "synthetic marginal aperture with revolving telescopes" (SMART). The SMART system 210 of FIG. 6 is in fact a modification of the PAIS II system of FIGS. 3 and 4. While the exemplary system 110 of FIG. 4 includes 8 satellites 112 that are equi-radially and equi-angularly disposed, and one central unit 119, all the nine satellites being in a constant relative position and orientation one with respect to all the others, the SMART system 210 includes only two revolving satellites 212a and 212b. Each single satellite 212a or 212b in the pair can revolve independently from the other satellite in the pair around the circle 211 (having a diameter D—not indicated), such that it can be positioned in any of the eight exemplary positions pos.a-pos.h. In fact, the relative positions between the two satellites 212a and 212b are sequentially varied such that all possible position-permutations that the two satellites can assume within the range of eight positions is fulfilled. In the example of FIG. 6 having two revolving satellites (212a and 212b) and 8 possible positions (pos.a-pos.h), there are 28 possible position-permutations. The structure of each satellite 212 is substantially the same as of each of the satellites 212 of FIG. 4. Each time when the pair of satellites 212 are located at a selected pair of positions (one of the permutational positions), the two satellites are activated simultaneously to acquire respective images (whether a point image, or an object image, respectively). In similarity to the system of FIGS. 3 and 4, each of the satellites 212a and 212b substantially includes at least a lens, and a CPM which is randomly coded, both are used to optically transmit PORI images or CORI images to the central unit 219. It should be noted that the SMART system of FIG. 6 may include any number of positions p, where p>2.

Figure 7A:
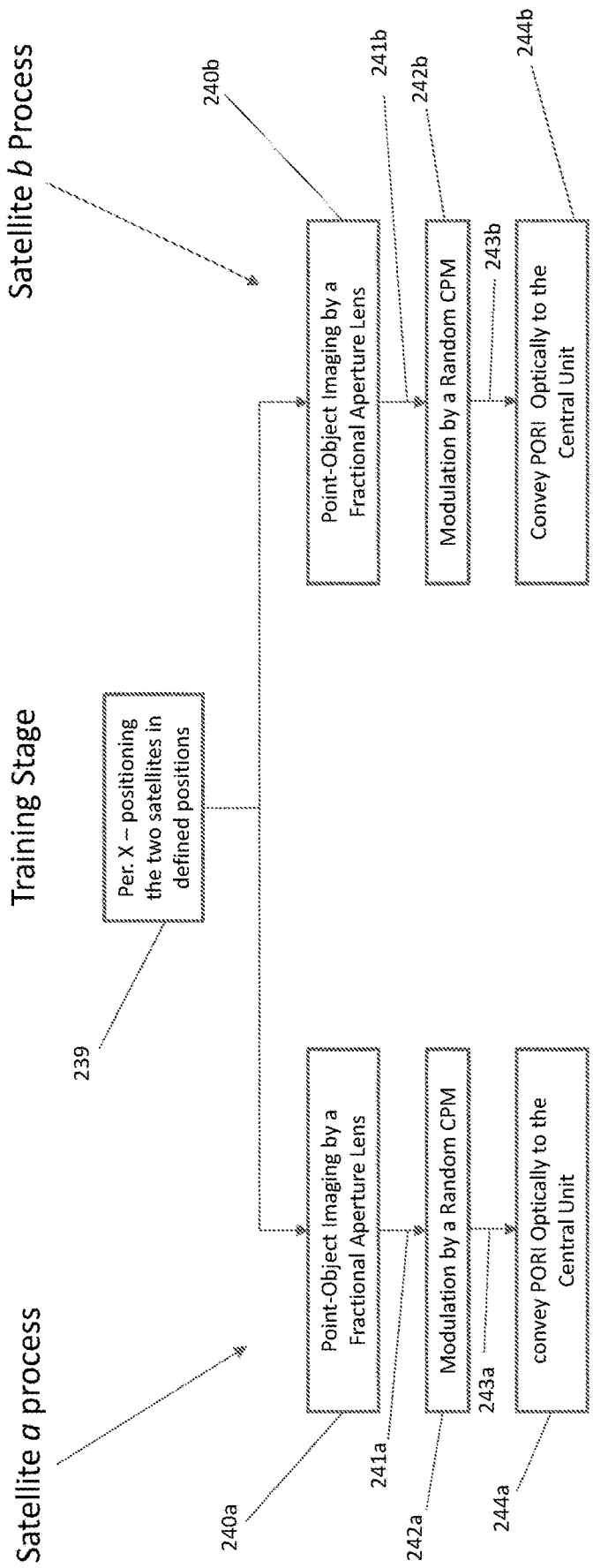
FIG. 7a illustrates in a general schematic block diagram form an exemplary process which is performed during a training stage of the SMART embodiment of FIG. 6.

The training stage of the SMART system of FIG. 6 is described in a flow diagram form in FIG. 7a. As will be described, each of the two satellites a and b creates during the repeated training stages one PORI for each permutation—in the example of FIG. 6, if there are 8 positions, there are 28 possible permutations, and 28 PORIs are created by each of the satellites. In step 239 a permutation is selected (for example, a first permutation), and the two satellites (satellite a and satellite b) are positioned at their respective positions. In steps 240a and 240b, each of the two satellites performs simultaneously with the other satellite a point-object imaging by the partial aperture lens of that satellite, forming a point image 241a, 241b, respectively. In steps 242a, 242b, each of the point images 241a and 241b are modulated respectively by a random CPM, producing a PORI 243a, 243b, respectively, in each of the satellites a and b. In steps 244a and 244b, the two PORIs are conveyed simultaneously and optically to the central unit 219. The procedure of FIG. 7a is repeated for all the additional permutations (27 additional repetitions in case of having 8 positions).

Figure 7B:
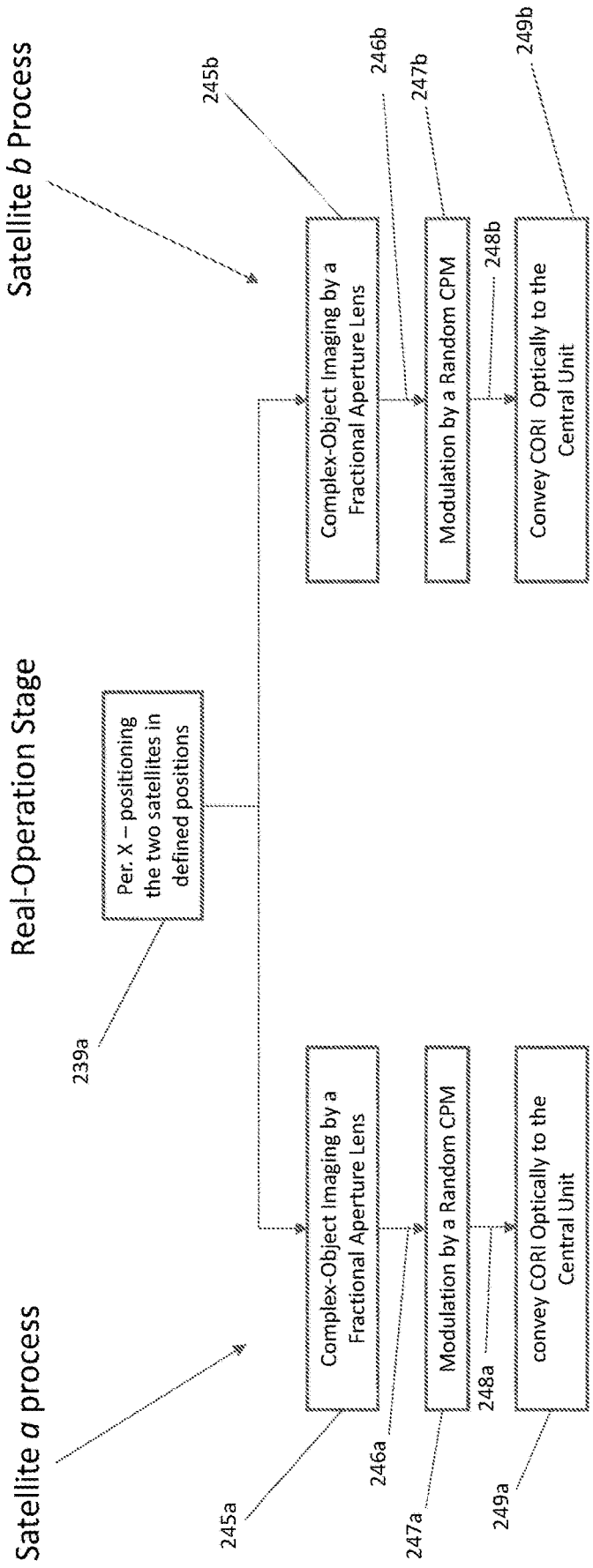
FIG. 7b illustrates in a general schematic block diagram form an exemplary process which is performed during a real-operation stage of the SMART embodiment of FIG. 6.

The real-operation stage of the SMART system of FIG. 6 is described in a flow diagram form in FIG. 7b. Each of the two satellites a and b creates during the real-operation repeated stages one CORI for each permutation—in the example of FIG. 6, if there are 8 positions, there are 28 possible permutations, and 28 CORIs are created by each of the satellites. In step 239a the two satellites (satellite a and satellite b) are positioned at their respective positions (or, if the real-operation stage is performed immediately after completion of a previous training stage in same permutation, they remain in their previous positions, respectively). In steps 245a and 245b, each of the two satellites performs simultaneously with the other satellite in the pair a complex-object imaging by the partial aperture lens of that satellite, forming a complex-image 246a, 246b, respectively. In steps 247a, 247b, each of the complex-images 246a and 246b are modulated respectively by a random CPM (each satellite uses the same random CPM that was used, respectively, during the respective training stage of that permutation), producing a CORI 248a, 248b, respectively, in each of the satellites a and b. In steps 249a and 249b, the two CORIs are conveyed simultaneously and optically to the central unit 219.

Figure 7C:
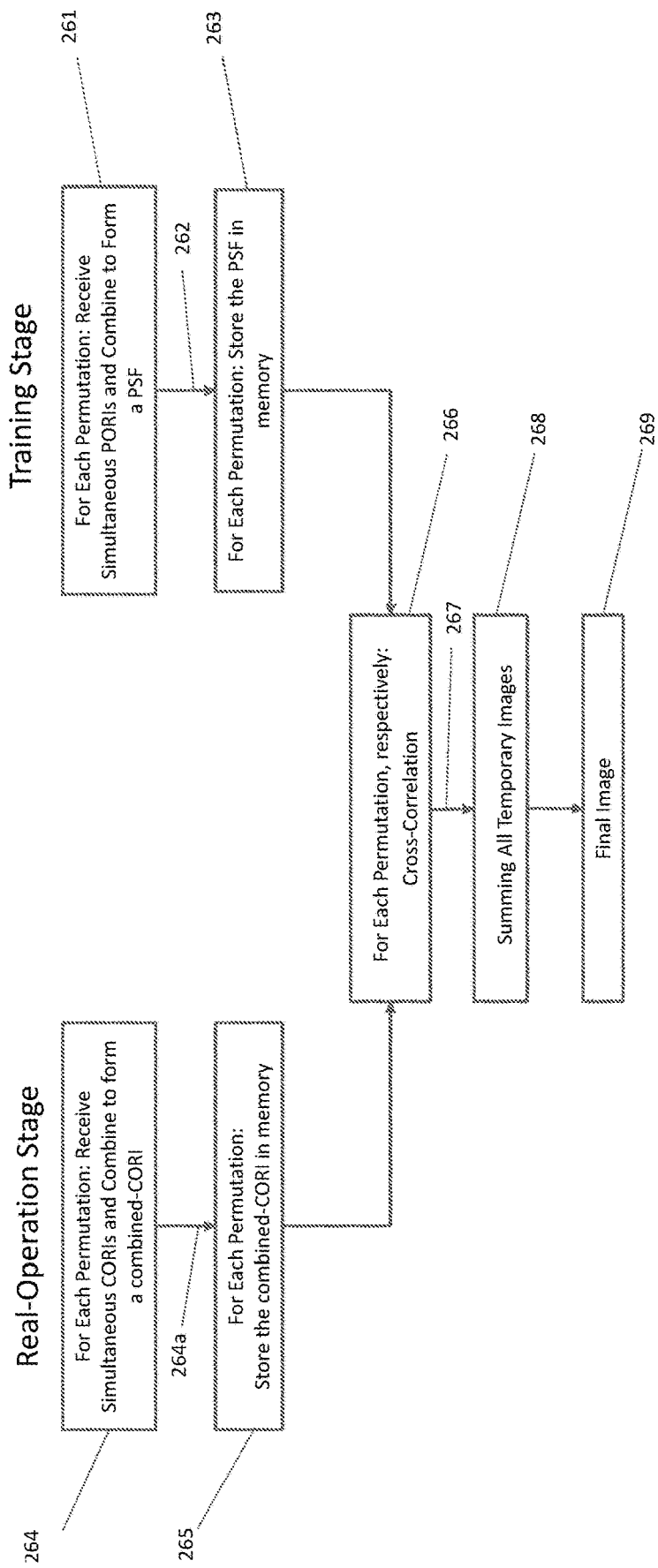
FIG. 7c illustrates in a general schematic block diagram form an exemplary process which is performed by the central unit of the SMART embodiment of FIG. 6.

The procedure at the central unit for the creation of a final image is described in a flow diagram form in FIG. 7c. In step 261, in each permutation, the two PORIs that are received optically and simultaneously from the two satellites a and b are combined at a receiving imager to form a PSF 262. In step 263, each PSF is stored in the memory. Therefore, for a case of 28 permutations, 28 PSFs are stored in the memory upon the completion of all the permutations. In step 264, in each permutation, the two CORIs that are received optically and simultaneously from the two satellites a and b are combined at the receiving imager to form a combined-CORI 264a. In step 265, each combined-CORI is stored in the memory. Therefore, for a case of 28 permutations, 28 combined-CORIs are stored in the memory when all the permutations are completed. In step 266, 28 cross-correlation operations (assuming 28 permutations) are performed, one for each permutation, while in each cross-correlation operation a PSF is cross-correlated with the respective combined-CORI of the same permutation. Therefore, at the end of all the cross-correlation operations of step 266, 28 temporary images 267 are created, one for each permutation. In step 268, all the 28 temporary images 267 are summed-up, to create the final image 269. As will be discussed in more details hereinafter, the resolution of the final image 269 which is achievable by the SMART process of FIGS. 7a-7c using an aperture having a diameter d in each satellite, is substantially the same as is achievable by a full circular aperture of diameter D operating in direct imaging (where for example d≤0.2 D).

Figure 7D:
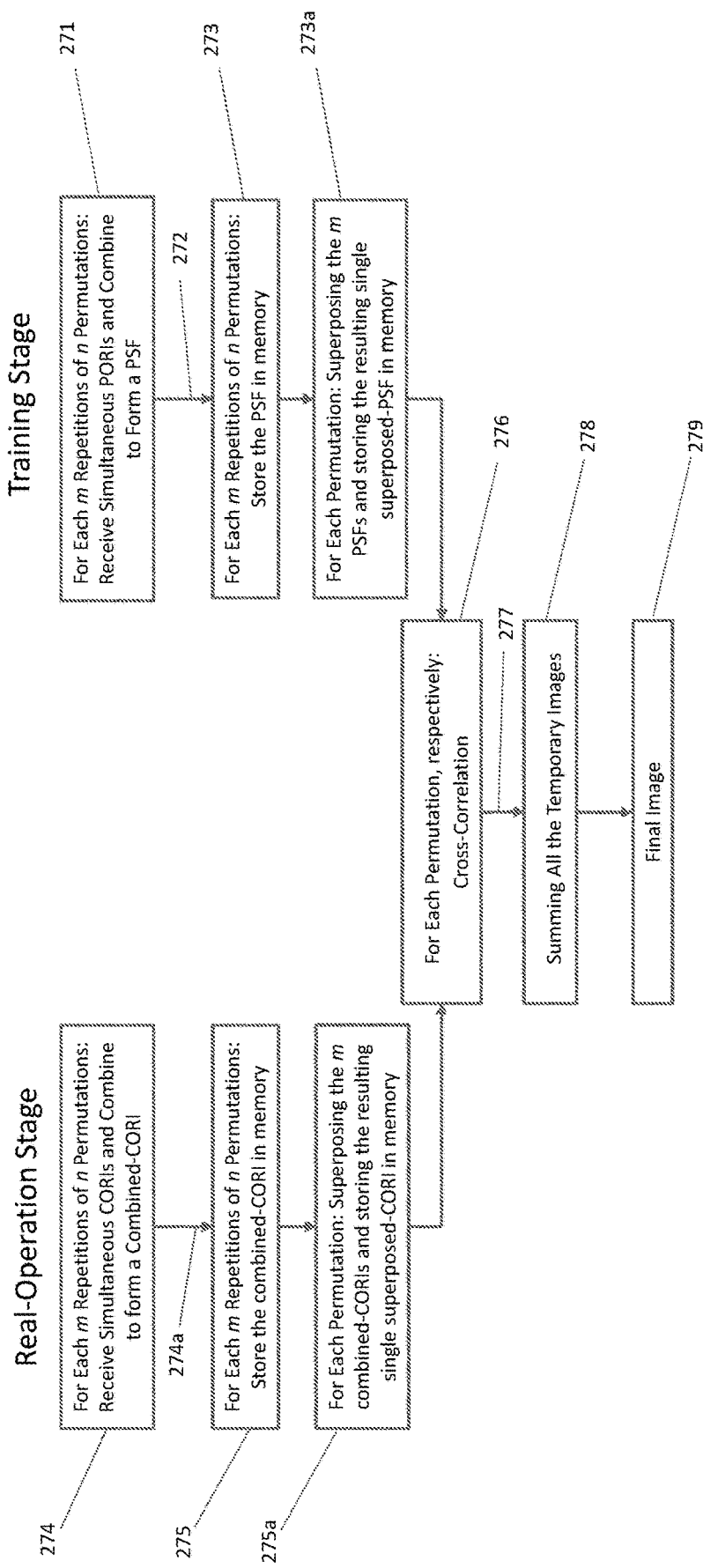
FIG. 7d illustrates in a general schematic block diagram form an exemplary process with repetitions which is performed by the central unit of the SMART embodiment of FIG. 6.

The results of the SMART procedure of FIGS. 7a-7c may be further improved, if several m repetitions (for example 3) are performed during each of the n permutations of the training stage and the real-operation stages of FIGS. 7a and 7b, respectively. FIG. 7d shows in a flow diagram form the process which is performed in such a repeated SMART system at the central unit. In such a case, in step 271, and assuming 3 repetitions and 28 permutations, 84 (28×3) PSFs 272 are created. In step 273, all the 84 PSFs are already stored in the memory upon the completion of all the repetitions and all the permutations. In step 273a, and upon the completion of all the m repetitions and all n permutations, all the m×n (for example, 84) PSFs are found stored in the memory. In step 273a, and for each of the n permutations (28 in this example) a super-position operation is performed between all the m repeated PSFs, respectively. Therefore, at the end of step 273a, the memory in fact stores n (in this example 28) super-positioned PSFs. A similar procedure is performed, respectively, in steps 274, 274a, 275, and 275a with respect to the combined CORIs, respectively, and again always keeping a same CPM in each training and its respective real-operation stage (while the CPM may be replaced in each of the satellites in each permutation and/or each repetition). Therefore, at the end of step 275a, the memory in fact stores n (in this example 28) combined and super-positioned CORIs as well. In step 266, 28 cross-correlation operations (assuming 28 permutations) are performed, one for each permutation, while in each cross-correlation operation a super-positioned PSF is cross-correlated with its respective combined and super-positioned CORI of the same permutation. Therefore, at the end of all the cross-correlation operations of step 276, 28 temporary images 277 are created, one for each permutation. In step 278, all the 28 temporary images 277 are summed-up, to create the final image 279. As will be discussed in more details hereinafter, the resolution of the final image 279 which is achievable by the repeated-SMART process of FIG. 7d, using an aperture having a diameter d in each satellite, is substantially the same as is achievable by a full aperture of diameter D operating in direct imaging (where for example d≤0.2 D), while also being superior compared to the final image 269 as achievable by the non-repeated SMART process of FIGS. 7a-7c.

It should be noted that the order (earlier or later) of the cross-correlations, super-positions, combinations, and summation operations that have been discussed throughout the application has been given as an example only. In various embodiments the order may vary, mutatis-mutandis, in a manner which is within the scope of the invention. Furthermore, the number of positions within the full aperture, as well as the number of images that are repeatedly acquired may also vary.

It should also be noted that for the sake of convenience the full apertures, as well as the partial apertures have been shown above as having circular shapes. This preferred shape should not be limiting, as various other shapes may also be applied without deviating from the scope of the invention.

It should also be noted that the number of the partial apertures, their exact locations, their equal angular distribution, and the equal gap between them are also only an example and can be modified.

It should also be noted that the examples above showing satellites should not be viewed as limiting the invention to air or out-of-atmosphere use only, as the invention may similarly applied also on the ground mutatis-mutandis.

It should also be noted that the SMART system may include more than two revolving satellites between the plurality of permutational-positions mutatis-mutandis.

Experiments

Figure 8:
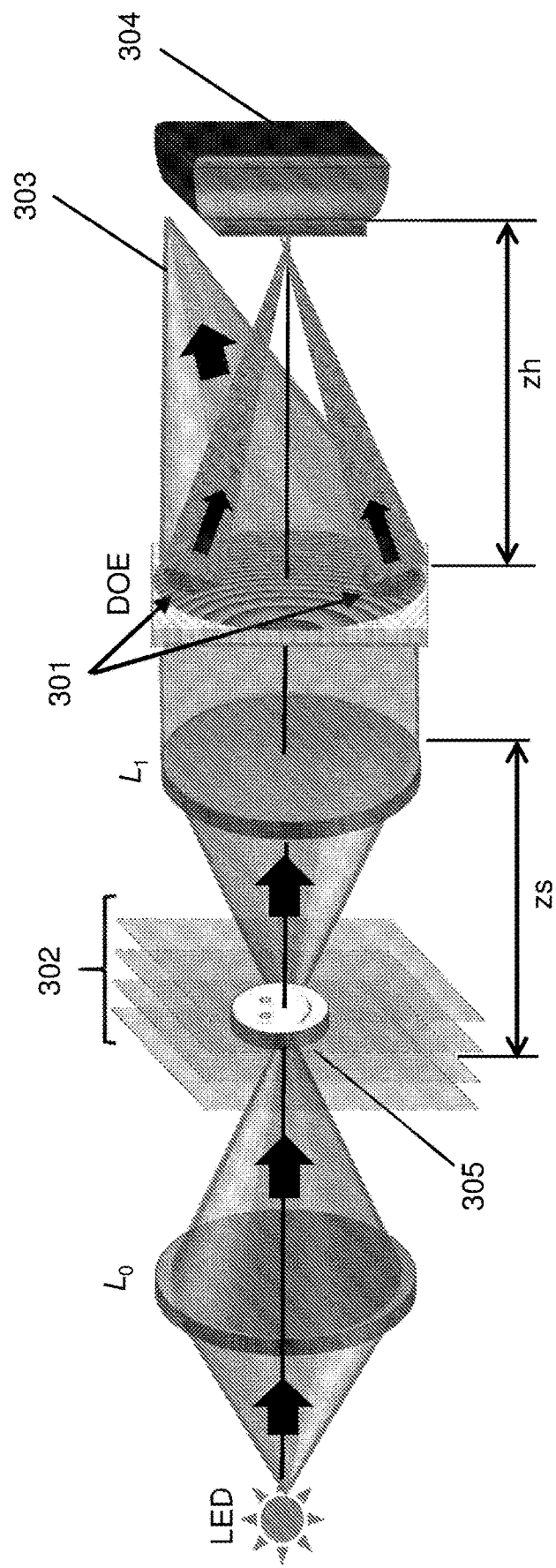
FIG. 8 illustrates a laboratory model which was used in experiments for proving the applicability of the invention.

A schematic of a laboratory model for testing the SMART and the PAIS embodiments is shown in FIG. 8.

The following indices designate components within the Figure:
CPM—Coded phase mask;
L0, L1—Refractive lenses;
LED—Light emitting diode;
DOE—Diffractive Optical Element;
301—CPM-partial aperture pairs;
302—Pinhole planes;
303—Light unmodulated by the CPM pair
304—Image sensor;

Incoherent light of LED was used to illuminate a point object by a lens $L_0$. The light emitted from the point object was used as a guide-star for the experiment. It was assumed that the light arrives from a far-field source and therefore the incident wave-front from each point source could be approximated to a plane wave.

This condition was optically simulated by collimating the light diffracted from the point object with a second refractive lens $L_1$. The collimated light was incident on a spatial light modulator (SLM) whose aperture function was engineered with diffractive optical functions to match the scenario of FIG. 6. A synthetic aperture grid consisting of eight points distributed with equal angular separations along a ring was used. In the case of SMART, the aperture was synthesized by distributing two relatively small circular pseudo-random CPMs, each of which was centered around one point from the aperture grid. This arrangement imitated the two orbiting satellites in all different 28 (N=8 in N(N−1)/2) possible permutations. The CPM pairs were synthesized using GSA (Gerchberg-Saxton algorithm). The SLM reflectivity was engineered further to deviate the light which is not incident on the pseudo-random sub-apertures (partial apertures) away 303 from the sensor using diffractive optical elements. Only the light from the sub-apertures was recorded by the image sensor 304 while the light from all other areas of the SLM was deflected away from the sensor.

Figure 9:
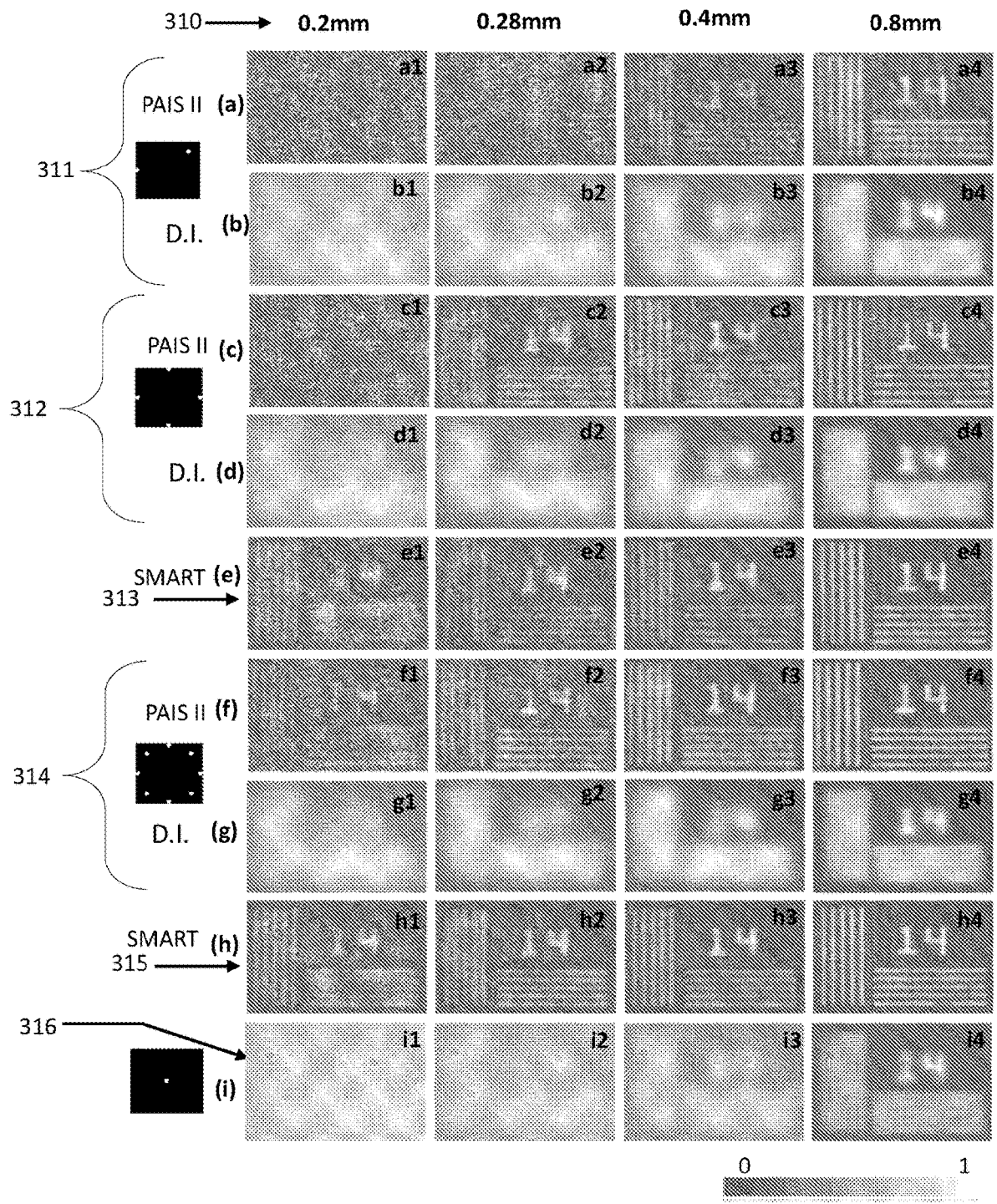
FIG. 9 shows experimental results comparing different structures of PAIS II, SMART and direct imaging (D.I.)

The experimental results are shown in FIG. 9. The following indications are used throughout the figure:
310—Radius of sub-aperture;
311—Image formed by pair of sub-apertures;
312—Image formed by 4 sub-apertures;
D.I.—Direct Imaging;
313—Image formed by all permutations of 4 positions—SMART;
314—Image formed by 8 sub-apertures;

315—Image formed by all permutations of 8 positions—SMART;

316—Image formed by a single central aperture—Direct Imaging (D.I.);

Different investigations were carried out to understand the SMART system in comparison to other similar imaging systems. Before the experiments of the synthetic aperture, the concept of sampling the annular aperture of PAIS II in a mode of physical, non-synthetic aperture was tested. First, the reconstruction results for full clear aperture were compared with that of PAIS II with the aperture of eight sub-apertures distributed along a ring, each of which with a pseudo-andom CPM and with a radius of 0.4 mm. The eight sub-aperture CPMs were synthesized using Gerchberg-Saxton algorithm (GSA) to produce as much as possible a uniform magnitude in the spectrum domain. The use of GSA has reduced the background noise during the reconstruction of the object image. The aperture transparency outside the eight sub-aperture CPMs was engineered with diffractive optical elements to deviate the light away from the image sensor. Therefore, only the light beams modulated by the eight sub-apertures were incident on the image sensor 304.

Figure 10:
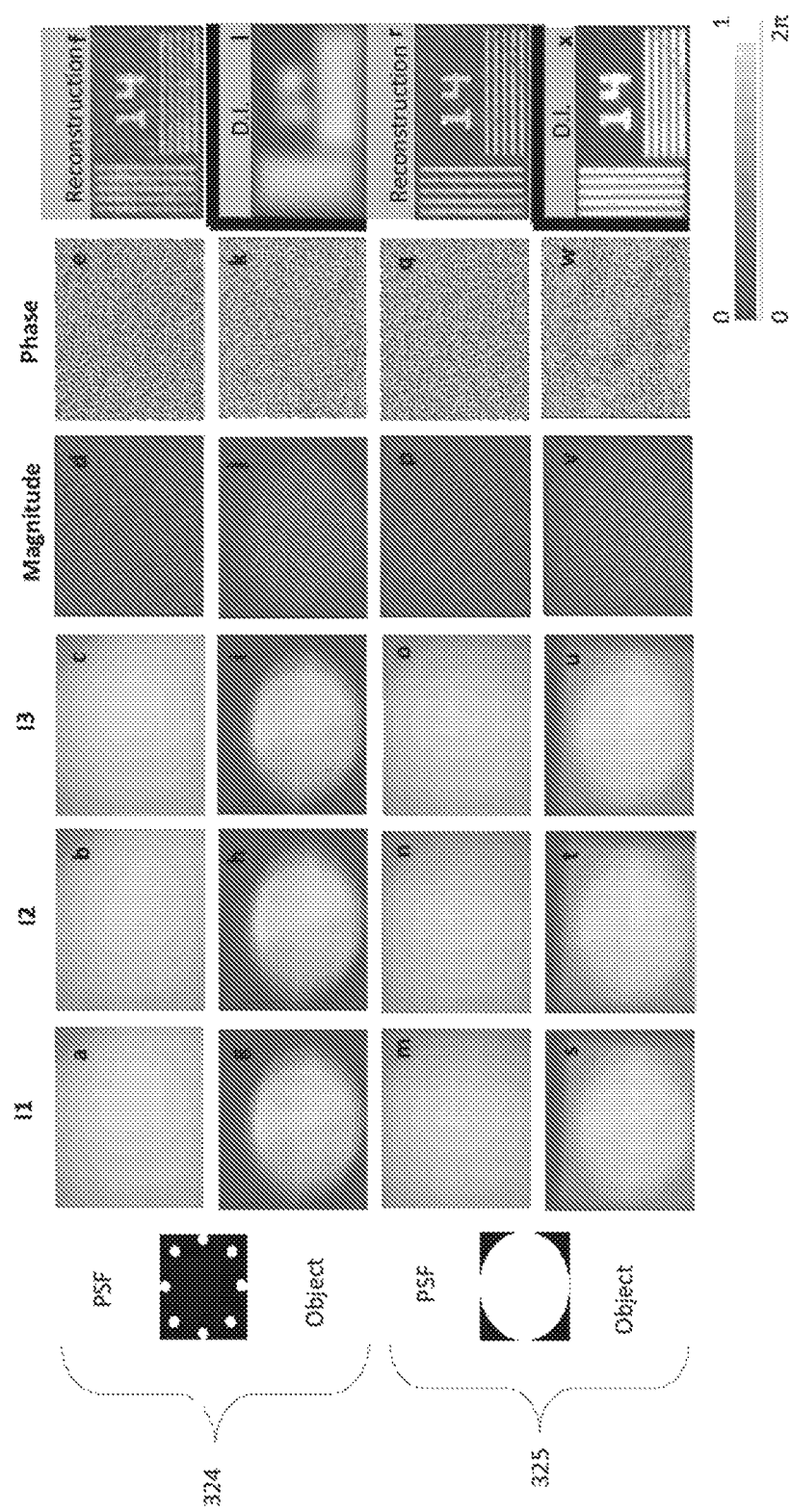
FIG. 10 shows experimental results comparing PAIS II and full-aperture direct imaging (D.I.)

The intensity patterns recorded for the point object and for 14 1 p/mm of National Bureau of Standards (NBS) resolution target, for eight sub-apertures and for three different CPMs, are shown in FIG. 10(*a*)-(*c*) and 10(*g*)-(*i*), respectively. The method of acquiring three intensity patterns by three camera shots, for the object as well as for the point, has been used as an effective tool to increase the signal-to-noise ratio (SNR). The set of three intensity patterns of FIG. 10(*a*)-(*c*) and FIG. 10(*g*)-(*i*) were superposed with three phase constants θ=0, 2π/3 and 4π/3 to generate a complex-valued impulse response hologram $H_{IR}$ ($H_{IR}$=PSF) and a complex-valued object response hologram ($H_{OR}$). The magnitude and phase of $H_{IR}$ and $H_{OR}$ are shown in FIGS. 10(*d*) and 10(*e*), and 10(*j*) and 10(*k*), respectively. $H_{OR}$ was cross-correlated with a phase-only filtered version of $H_{IR}$ and the reconstructed image is shown in FIG. 10(*f*). The direct imaging result using a lens function over only the eight sub-apertures is shown in FIG. 10(*l*). It is evident from FIGS. 10(*f*) and 10(*l*) that direct imaging (D.I.) through an aperture of eight sub-apertures cannot resolve the fine details of the object as PAIS II with the same aperture does. This experiment reveals that PAIS II with eight sub-apertures has a higher imaging resolution compared to an equivalent direct imaging system. In 324 the radius of each of sub-aperture was 0.4 mm. In 325 a full aperture was used.

For comparison purposes, a similar experiment of I-COACH with a full clear aperture of 4.32 mm radius, is depicted in FIGS. 10(*m*)-(*w*). Note that I-COACH is similar to PAIS in the sense of the imaging procedure, but unlike PAIS, I-COACH has a full disk-shape aperture. I-COACH differs from direct imaging, as in direct imaging there is not any procedure, since the image is obtained on the camera directly. The intensity patterns recorded for the point object, and for the "complex object" for full aperture are shown in FIGS. 10(*m*)-(*o*) and 10(*s*)-2(*u*), respectively. The magnitude and phase of the complex $H_{IR}$ for full aperture are shown in FIGS. 10(*p*) and 10(*q*), respectively. The magnitude and phase of $H_{OR}$ for full aperture are shown in FIGS. 10(*v*) and 10(*w*), respectively. The $H_{OR}$ was cross-correlated with phase-only filtered $H_{IR}$ and the reconstructed image is shown in FIG. 10(*r*). The direct imaging result using a lens function with full aperture is shown in FIG. 10(*x*). By comparison of FIGS. 10(*f*), 10(*l*), 10(*r*) and 10(*x*) one can conclude that although the SNR of PAIS II-FIG. 2(*f*), is lower than those of the full aperture I-COACH and direct imaging, the imaging resolution is the same, whereas in direct imaging through the partial aperture, the resolution is poorer. These comparisons indicate that the resolution limit of PAIS is the same as of direct imaging with clear full aperture, although the area of the PAIS II aperture (the total area of the eight circles) in this experiment is less than 7% of the full aperture. However, as explained later, in order to maintain the resolution performance of the full aperture, the partial aperture should be distributed along the perimeter of the full aperture.

In the next experiment, the influence of the sub-aperture size on the quality of the reconstructed images was investigated. This comparative investigation was done with four arrangements of the sub-apertures; In FIG. 9(*a*)-(*b*) there were two sub-apertures on the perimeter, in FIG. 9(*c*)-(*e*) and 9(*f*)-(*h*) there were four and eight, sub-apertures respectively, distributed with equal gaps on the perimeter and in FIG. 9(*i*) there was a single sub-aperture in the center. In all these aperture configurations, four sizes of the sub-apertures with the radiuses of r=0.2, 0.28, 0.4 and 0.8 mm were tested. Three imaging methods were compared in FIG. 9: direct imaging (FIGS. 9(*b*), (*d*), (*g*) and (*i*)), PAIS II (FIGS. 9 (*a*), (*c*) and (*f*)) and SMART (FIGS. 9(*e*) and (*h*)). Unlike PAIS II in which all the sub-apertures were involved in the imaging at any given time, in SMART only a single pair of sub-apertures reflected the light onto the sensor at any given time. Based on FIG. 9, it is clear that SMART is capable of reconstructing the object with more visual details in comparison to direct imaging, as well as PAIS II, in both four and eight symmetric points. However as expected, a decrease in the visibility and some increase in noise is noticed when the sub-aperture radius is decreased from 0.8 to 0.2 mm. With a radius of 0.2 mm, even though the reconstruction result is better than direct imaging, as well as PAIS II, the visibility is lower and the noise level is higher. Furthermore, it is clear and expected that SMART with eight sub-apertures yields a better-quality image than that of four sub-apertures.

Figure 11:
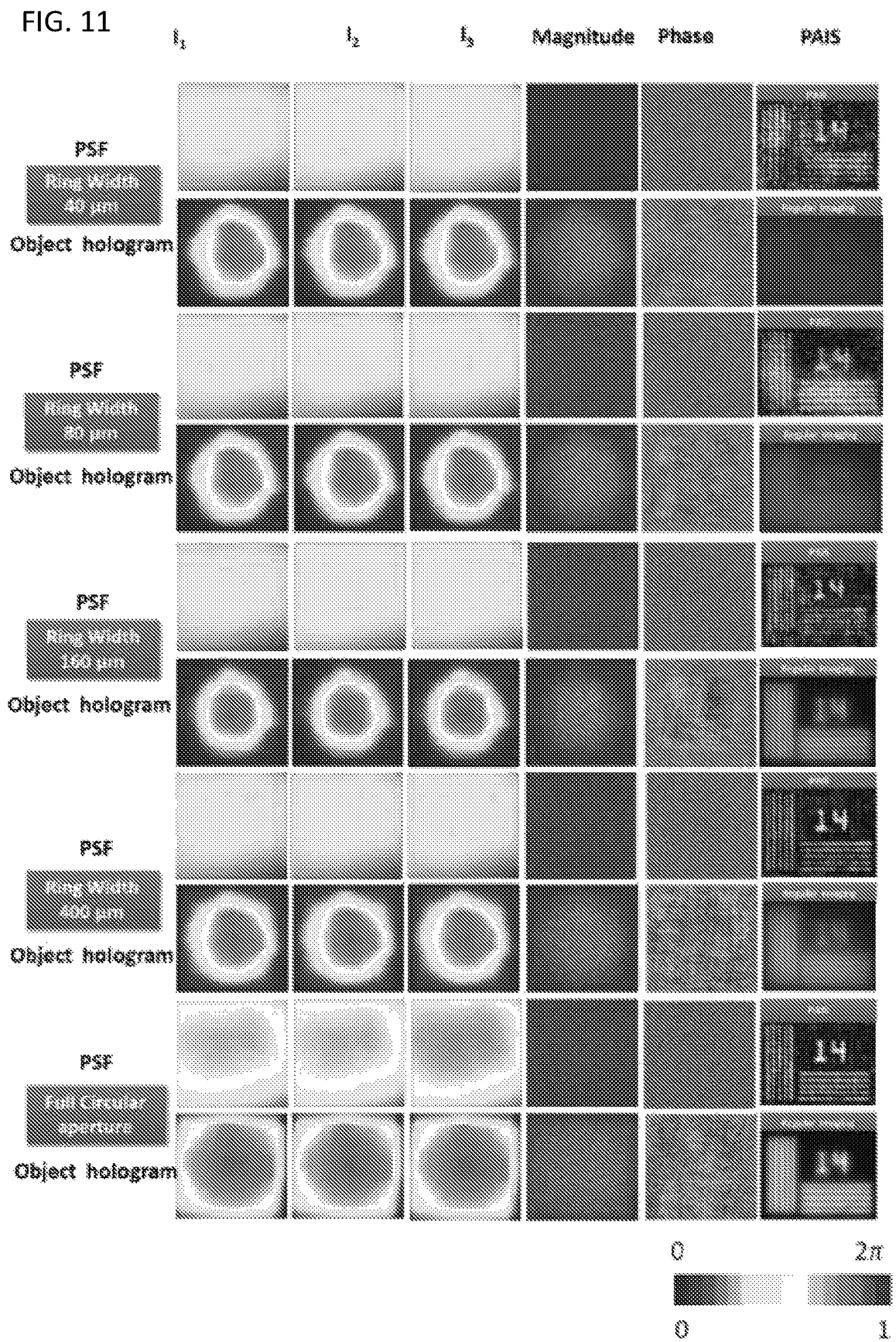
FIG. 11 shows experimental results comparing different structures of PAIS I and full aperture direct imaging (D.I.)

FIG. 11 shows experimental results that were obtained with respect to the PAIS I embodiment—operating with a ring-type partial aperture. More specifically, the figure provides intensity patterns, magnitude and phase of PSF and complex-object holograms, and their reconstructions for the cases having ring widths of 40 μm, 80 μm, 160 μm, and 400 μm in comparison with direct imaging with a 4.3 mm full aperture.

While the invention has been described with respect to a limited number of embodiments, it will be appreciated that many variations, modifications and other applications of the invention may be made. Therefore, the claimed invention as recited in the claims that follow is not limited to the embodiments described herein.

The invention claimed is:

1. A partial-aperture imaging system, comprising:
   (a) one or more partial-aperture units, each partial-aperture unit comprising:
      one or more partial apertures that are disposed over a periphery of a circular area representing a full aperture having a diameter D, each of said partial apertures being directed towards a scenery, while the total area of all said partial apertures spans only a portion of said area of the full aperture;
      one coded phase mask (CPM) for each of said partial apertures, respectively, said CPM receiving one at a time, from a respective partial aperture at least one point-object image and at least one complex-object image, said CPM modulating respectively by a same random code the phases of pixels of one or more pairs of said point-object and complex-object images, thereby to form respectively point-object random images (PORIs) and complex-object random image (CORIs);

an imager for optically receiving said at least one PORI—each PORI being defined as a PSF, respectively, and at least one CORI, and for storing in a memory; and (b) a processor for cross-correlating those pairs of PSFs and CORIs that have been randomly modulated by a same-code CPM, thereby to form a final image.

2. The partial aperture imaging system of claim 1, wherein each of said PORIs is created during a training stage.

3. The partial aperture imaging system of claim 1, wherein each of said CORIs is created during a real-operation stage.

4. The partial aperture imaging system of claim 1, wherein each of said partial apertures is a lens, and wherein said lens and said CPM are contained within an integrated lens-modulator item.

5. The partial aperture imaging system of claim 1, further comprising a single partial aperture having a shape of a ring, said ring having a largest diameter of D and a thickness h, wherein h≤D.

6. The partial aperture imaging system of claim 5, wherein said partial aperture, said CPM, said imager, and said processor are contained within a same partial aperture unit.

7. The partial-aperture imaging system of claim 1, further comprising:
(a) a plurality of said partial aperture units that are equi-radially disposed and equi-angularly spaced at the periphery of said circular area representing full aperture, all said partial aperture units are activated simultaneously once during a training stage and then during a real-operation stage, to produce PORIs and CORIs, respectively, and to simultaneously and optically convey the PORIs and CORIs, whichever is the case, to a central unit; and
(b) said central unit which is positioned at a remote location viewable by each of said partial-aperture units, said central unit comprising:
said imager for receiving said simultaneous PORIs and said simultaneous CORIs, respectively, as conveyed from said plurality of partial-aperture units, and for combining them to at least one combined-PORI which is defined as PSF, and to at least one combined-CORI, respectively;
said processor for cross-correlating one or more of said pairs, each comprising a PSF and a combined-CORI that have been randomly modulated by a same randomly coded CPM, thereby to form the final image.

8. The partial-aperture imaging system of claim 7, further comprising:
(a) at each partial aperture unit:
an arrangement for performing one or more additional repetitions of PORIs and CORIs creations, each repetition results in a simultaneous optical conveyance of repeated PORIs and repeated CORIs, respectively by all aperture units, to the central unit; and
(b) at the central unit:
said processor for super-positioning separately all the repeated combined-PORIs—defined as PSFs, and all the repeated combined-CORIs, to form a superposed PSF and a superposed CORI, respectively, and for cross-correlating said superposed PSF and said superposed CORI to form the final image.

9. The partial-aperture imaging system of claim 1, further comprising:
(a) two or more revolving partial aperture units that are movable between permutations of predefined positions at the periphery of said circular area representing the full aperture, said two or more revolving partial aperture units, when positioned at respective positions relating to each specific permutation, are activated simultaneously during training and real-operation stages, respectively, to produce PORIs and CORIs, respectively, and to simultaneously and optically convey the PORIs and CORIs, whichever is the case, to a central unit; and
(b) said central unit which is positioned at a remote location viewable by each of said partial-aperture units, said central unit comprising:
said central unit imager for simultaneously receiving at each permutation a plurality of PORIs and a plurality of CORIs, respectively, from said partial-aperture units, and for combining them to combined-PORIs—defined as PSF, and combined-CORIs, respectively;
said processor for first cross-correlating separately each of the pairs, each pair comprising a PSF and a combined-CORI, respectively, that have been randomly modulated by the same CPM, thereby to form by each repetition a temporary image, and then to sum all the separate temporary images to form the final image.

10. The partial-aperture imaging system of claim 9, wherein said two or more revolving partial aperture units are a pair of revolving partial aperture units.

11. The partial-aperture imaging system of claim 9, wherein said predefined positions at the periphery of said circular area representing the full aperture are equi-radially disposed and equi-angularly spaced.

12. The partial-aperture imaging system of claim 9, wherein the system performs several repetitions in each of said permutational positions and wherein said processor at the central unit performs a super-position of all the PSFs that are included in a same permutation and a super-position of all the PORIs that are included in a same permutation, prior to performing said cross correlation.

13. A method for performing partial-aperture imaging comprising:
(a) predefining a circular area representing a full aperture having a diameter D;
(b) providing one or more partial aperture units that are disposed at the periphery of said full aperture area, each partial unit comprising:
a partial aperture for acquiring images from a scenery; and
one coded phase mask (CPM) for randomly modulating phases of pixels of the images received from said partial aperture;
(c) providing an imager for receiving one or more simultaneous images from said CPM;
(d) during a training stage:
acquiring a point image from the scenery;
subjecting the point image to said CPM thereby to form a point-object random image (PORI), and conveying optically to said imager; and
defining the PORI, as viewed by the imager, as a PSF and storing in a memory;
(e) during a real-operation stage:
acquiring a complex-object image from the scenery;

subjecting the complex-object image to said CPM thereby to form a complex-object random image (CORI), and conveying to said imager; and storing the CORI as viewed by the imager in the memory; and (f) cross correlating between said stored PSF and said stored CORI, thereby to form a final image.

14. The method of claim 13, wherein each of said partial apertures is a lens, and said lens and said CPM are contained within an integrated lens-modulator item.

15. The method of claim 13, wherein said at least one partial aperture is a ring having a largest diameter of D and a thickness h, wherein h≤D.

16. The method of claim 13, wherein said partial aperture, said CPM, said imager and said processor are contained within a same partial aperture unit.

17. The method of claim 13, which is repeated several times, and wherein:

the several created and stored PSFs are superposed to create a single PSF;

the several created and stored CORIs are superposed to create a single CORI; and the cross-correlation is performed between said stored single PSF and said stored single CORI.

18. The method of claim 13, wherein:

said at least one partial aperture units are a plurality of partial aperture units that are equi-radially disposed and equi-angularly spaced at the periphery of said circular area representing full aperture, each of said partial aperture units comprising said partial aperture having a diameter d where d<D, and said CPM; and said imager, said processor, and said memory are contained within a central unit which is viewable by each of said partial aperture units.

19. The method of claim 18, further comprising:

performing each of said training stage and real-operation stage simultaneously by all the partial aperture units, thereby to convey a plurality of simultaneous PORIs and a plurality of simultaneous CORIs, respectively, to the central unit;

receiving by the imager of the central unit said simultaneous PORIs during the training stage, combining them to a PSF, and storing in the memory;

receiving by the imager of the central unit said simultaneous CORIs during the real-operation stage, combining them to a combined-CORI, and storing in the memory; and cross-correlating between said PSF and said combined CORI to form the final image.

20. The method of claim 19, which is repeated several times, and further comprising:

superposing all the plurality of the PSFs as created at the central unit during a plurality of the training stages thereby to form a superposed PSF, and storing in the memory;

superposing all the plurality of the combined-CORIs as created at the central unit during a plurality of the real-operation stages, thereby to form a superposed-CORI, and storing in the memory; and cross-correlating between the superposed PSF and the superposed-CORI, thereby to form the final image.

21. The method of claim 13, wherein:

said at least one partial aperture units are a pair of partial aperture units that are revolving between a plurality of permutational positions, said positions are equi-radially disposed and equi-angularly spaced at the periphery of said circular area representing full aperture, each of said partial aperture units comprising said partial aperture-having a diameter d where d<D, and said CPM;

said imager, said processor, and said memory are contained within a central unit which is viewable by each of said partial aperture units.

22. The method of claim 21, comprising:

positioning said pair of partial aperture units at first permutational position, performing each of said training stage and real-operation stage simultaneously by the pair of partial aperture units, thereby to convey a pair of simultaneous PORIs and a pair of simultaneous CORIs, respectively, to the central unit;

receiving by the imager of the central unit said pair of simultaneous PORIs during the training stage, combining them to a PSF, and storing in the memory;

receiving by the imager of the central unit said pair of simultaneous CORIs during the real-operation stage, combining them to a combined-CORI, and storing in the memory;

repeating all the above stages for all the rest of the permutational positions;

for each permutation, cross-correlating between the respective PSF and the respective combined-CORI, thereby to obtain a plurality of temporary images, one temporary image for each permutation; and summing-up all said temporary images, thereby to form the final image.

23. The method of claim 22, further comprising:

repeating m times each of said training stage and said real-operation stage for each of the n permutational positions;

for each of m repetitions of n permutations training stage, storing the PSF in the memory;

for each permutation, superposing the m PSFs and storing a resulting single superposed-PSF in memory;

for each m Repetitions of n permutations real operation stage, storing the combined-CORI in the memory;

for each permutation, superposing the m combined-CORIs and storing a resulting single superposed-CORI in the memory;

for each permutation, respectively, cross-correlating between the respective superposed-CORI and the superposed-PSF to obtain a temporary image; and summing all the temporary images to obtain the final image.

* * * * *